United States Patent
Reddy

(10) Patent No.: US 12,190,326 B2
(45) Date of Patent: *Jan. 7, 2025

(54) SYSTEMS AND METHODS FOR DIGITIZED PROOF OF TRANSACTIONS

(71) Applicant: Wells Fargo Bank, N.A., San Francisco, CA (US)

(72) Inventor: Garlapati Sreenivasa Reddy, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,226

(22) Filed: Nov. 17, 2023

(65) Prior Publication Data
US 2024/0086928 A1 Mar. 14, 2024

Related U.S. Application Data

(63) Continuation of application No. 17/325,974, filed on May 20, 2021, now Pat. No. 11,823,202.

(51) Int. Cl.
*G06Q 20/40* (2012.01)
*G06Q 20/38* (2012.01)
*H04L 9/40* (2022.01)

(52) U.S. Cl.
CPC ....... *G06Q 20/4016* (2013.01); *G06Q 20/389* (2013.01); *G06Q 20/407* (2013.01)

(58) Field of Classification Search
None
See application file for complete search history.

(56) References Cited

U.S. PATENT DOCUMENTS

| | | | |
|---|---|---|---|
| 7,802,720 B2 | 9/2010 | Yang | |
| 7,950,573 B1 | 5/2011 | Enright et al. | |
| 9,292,875 B1 | 3/2016 | Candelore et al. | |
| 9,367,845 B2 | 6/2016 | Candelore et al. | |
| 9,672,510 B2 * | 6/2017 | Roach | G06Q 20/3223 |
| 9,984,362 B2 | 5/2018 | Aidasani et al. | |
| 10,289,287 B2 | 5/2019 | Rathod | |
| 10,672,005 B1 * | 6/2020 | Hart | G06Q 20/401 |
| 2006/0129845 A1 | 6/2006 | Nakashima et al. | |

(Continued)

FOREIGN PATENT DOCUMENTS

| | | |
|---|---|---|
| JP | 2019-012303 | 1/2019 |
| WO | WO-2016/175373 | 11/2016 |

*Primary Examiner* — Bennett M Sigmond
*Assistant Examiner* — Bhavin D Shah
(74) *Attorney, Agent, or Firm* — Foley & Lardner LLP

(57) ABSTRACT

A method can include receiving first data corresponding to a transaction between a merchant and a customer; receiving second data captured at substantially the same time as the transaction and at a location corresponding to the transaction; generating a designation for the transaction based on a first match between the good identified in the first image and the identifying information and a second match between the depiction of the customer and a profile image of the customer; storing third data comprising at least one of the plurality of images and a unique identifier assigned to the transaction; and linking the second data to the third data; populating a claim with at least some of the second data and the third data according to a selection of a user interface element.

15 Claims, 13 Drawing Sheets

(56) References Cited

U.S. PATENT DOCUMENTS

| | | | |
|---|---|---|---|
| 2008/0270209 A1* | 10/2008 | Mauseth | G06Q 30/0201 |
| | | | 705/7.29 |
| 2009/0039164 A1* | 2/2009 | Herwig | G07G 1/14 |
| | | | 235/462.41 |
| 2012/0239542 A1 | 9/2012 | Preston et al. | |
| 2013/0197998 A1 | 8/2013 | Buhrmann et al. | |
| 2014/0337221 A1* | 11/2014 | Hoyos | G06Q 20/3276 |
| | | | 705/44 |
| 2016/0132890 A1 | 5/2016 | Banerjee et al. | |
| 2017/0372292 A1 | 12/2017 | Reyes et al. | |
| 2018/0174150 A1 | 6/2018 | Das | |
| 2019/0236594 A1 | 8/2019 | Ehrlich-Quinn | |

* cited by examiner

SYSTEMS AND METHODS FOR DIGITIZED PROOF OF TRANSACTIONS

CROSS-REFERENCE TO RELATED APPLICATION

The present application is a continuation of U.S. patent application Ser. No. 17/325,974, filed May 20, 2021, which is incorporated herein by reference in its entirety.

BACKGROUND

Provider institutions, such as financial institutions, can maintain information relating to transactions between customers and merchants. In some instances, this information can be helpful when determining whether fraud has been committed. As a result, it can be helpful for parties of a transaction to provide information corresponding to the transaction to the provider institution and periodically update or verify the stored information.

SUMMARY

At least one aspect of this disclosure is directed to a method. The method can include receiving, by a computing system, transaction information corresponding to a transaction between a merchant and a customer. The method can include receiving one or more images captured via a camera during the transaction. The method can include analyzing, by the computing system, the one or more images captured by the camera to detect one or more features relating to the transaction in the one or more images. The method can include generating, by the computing system, a designation for the transaction based on the one or more features detected in the one or more images. The designation can comprise at least one of verified or unverified. The method can include storing, by the computing system, the transaction information and the one or more images with the designation for the transaction in an account associated with the customer maintained in an accounts database.

At least one aspect of this disclosure is directed to a system. The system can include an accounts database structured to retrievably store data corresponding to a plurality of transactions. The data can include transaction information, one or more images, and a designation for each of the plurality of transactions. The system can include a computing system. The computing system can be configured to receive the transaction information corresponding to a transaction between a merchant and a customer, and the one or more images captured via a camera during the transaction. The computing system can be configured to analyze the one or more images captured by the camera to detect one or more features relating to the transaction in the one or more images. The computing system can be configured to generate the designation for the transaction based on the one or more features detected in the one or more images. The designation can comprise at least one of verified or unverified. The computing system can be configured to store the transaction information and the one or more images with the designation for the transaction in an account associated with the customer maintained in the accounts database.

At least one aspect of this disclosure is directed to a device. The device can include at least one camera. The device can include a processing circuit communicably coupled to the at least one camera. The processing circuit can include at least one processor and memory storing instructions that, when executed by a processor, can cause the processor to receive transaction information corresponding to a transaction between a merchant and a customer. Executing the instructions can cause the processor to capture one or more images using the at least one camera of the device. Executing the instructions can cause the processor to analyze the one or more images received from the device to detect one or more features relating to the transaction in the one or more images. Executing the instructions can cause the processor to generate a designation for the transaction based on the one or more features detected in the one or more images. The designation can include at least one of verified or unverified. Executing the instructions can cause the processor to transmit, to a computing system, the transaction information and the one or more images with the designation for the transaction for storage in an accounts database in association with an account of the customer.

DETAILED DESCRIPTION

Figure 1:
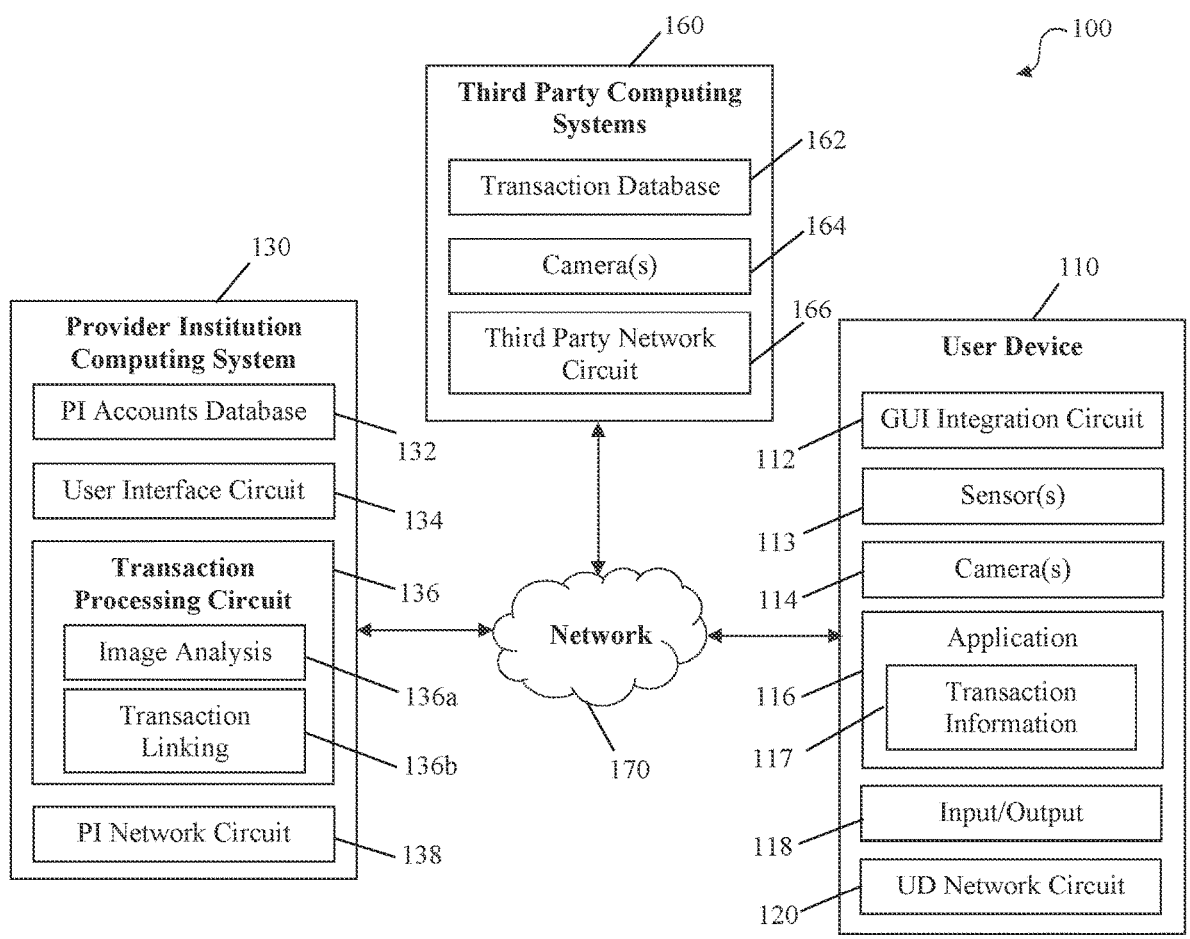
FIG. 1 depicts an exemplary block diagram of a system for providing a dynamic user interface for receiving and analyzing data, according to an example embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Various embodiments discussed herein relate to systems and methods of receiving and analyzing information corresponding to transactions for detecting fraudulent transactions and filing fraud claims. In various embodiments, a party to a transaction can capture images of the transaction and can provide the images, and any other information related to the transaction (such as items purchased during the transaction, a transaction date, etc.), to a provider institution. The images and other related information can be saved to a database as proof of transactions. Image analysis can be performed on the images to identify a person in the images, and determine if that person matches a user of a user device who is authorized to conduct the transaction. Additionally, the images may be analyzed to detect items which were purchased during the transaction. Based on the analysis of the images and whether the authorized user can be identified in the images, each transaction can receive a designation indicating whether the transaction is fraudulent. The user of the user device can receive an alert notifying the user of the assigned designation. If fraud is detected (i.e., if the user in the image does not match an authorized user, if transaction data indicating items purchased during the transaction do not match the items included in the image), the user can receive and review all the images and other related information corresponding to the transaction and can instantly initiate a fraud claim if desired. A fraud claim request can automatically populate with the information stored in the database, and submission of the fraud claim can include sending the stored proof of transactions to the recipient of the fraud claim.

The systems and methods described herein may provide various improvements over existing technologies. For example, the systems and methods described herein may expedite detection of fraud through the use of image processing and real-time transaction data which is recorded/obtained by user devices participating in the transaction. Additionally, the systems and methods described herein may facilitate more detailed transaction history data by providing a database which includes data for a transaction and image data obtained by the device(s) during a given transaction. Furthermore, the systems and methods described herein may prevent erroneous fraud claims by leveraging data from multiple separate sources (i.e., data from a user device/merchant computing systems/and so forth). The systems and methods described herein may improve the functioning of transaction processing and fraud detection systems by performing real-time analysis of the images obtained during a transaction, rather than waiting for a user to identify a processed transaction as potentially fraudulent. Various other advantages and improvements of the present systems and methods are described in greater detail below.

As used herein, the term "field" refers to a portion of a user interface viewable by the user on a device. Any interface viewable on a mobile device display may include any number of fields. Fields may be completely separate portions of the user interface or may be overlapping with one another. Any field may contain any number of elements such as headers, graphics, icon, information, and the like.

As used herein, the term "interaction point" refers to an element on a user interface on a user device that the user can interact with (e.g., by pressing the screen in a position corresponding to the interaction point or swiping the screen) to induce a responsive action by the user device (e.g., button(s), icon(s), switch(es), alpha-numeric text, hyperlinks, etc.). For example, the user may interact with one interaction point to cause the user device to present another user interface containing information different from the interface initially containing the interaction point.

Referring now to FIG. 1, a block diagram of a computer-implemented system 100 for providing a dynamic user interface for receiving and analyzing data is shown, according to an example embodiment. The computer-implemented system 100 can be configured to receive and analyze data associated with transactions to facilitate the detection of fraudulent transactions. The computer-implemented system 100 can facilitate automatic detection of fraud and simplify manual detection of fraud. For example, regarding automated detection, the computer-implemented system 100 can be configured to detect discrepancies between the parties of a transaction and the parties that were authorized to participate in the transaction. If a discrepancy is detected, the computer-implemented system 100 can be configured to classify the transaction as fraudulent and alert a user. Regarding manual detection, the computer-implemented system 100 can be configured to receive and store information corresponding to transactions (e.g., images, receipts). If a user wants to review a transaction, the user can access the information rather than having to recall the information from memory. As such, the computer-implemented system 100 digitizes proof of transactions that can be used for detecting fraudulent transactions (both automatically and manually). If a fraudulent transaction is detected (either manually or automatically), the computer-implemented system 100 can be further configured to guide the user through submitting a fraud claim.

As shown, the computer-implemented system 100 includes a user device 110 associated with a user, a provider institution computing system 130 associated with a provider such as a financial institution, and one or more third party computing systems 160 associated with various third parties. The various systems and devices may be communicatively and operatively coupled through a network 170, which may include one or more of the Internet, cellular network, Wi-Fi, Wi-Max, a proprietary banking network, or any other type of wired or wireless network or a combination of wired and wireless networks. As described herein, the computer-implemented system 100 may be used to facilitate collection, analysis, and verification of data provided by the user device 110.

The user device 110 can be a mobile device or any device comprising a computing system associated with a user, who may be a customer, or any other party, in a transaction. The user device 110 can be structured to exchange data over the network 170, execute software applications, access websites, generate graphical user interfaces, and/or perform other operations described herein. The user device 110 may include one or more of a smartphone or other cellular device, a wearable computing device (e.g., eyewear, a watch or bracelet, etc.), a tablet, a portable gaming device, a laptop, a desktop, or a portable computing device.

The user device 110 includes a graphical user interface (GUI) integration circuit 112, a sensor 113, a camera 114, an application 116, a user input/output ("I/O") device 118, and a user device network circuit 120 enabling the user device to exchange information over the network 170. The user I/O device 118 includes hardware and associated logic configured to facilitate exchanging information with a user and other devices (e.g., a merchant transaction terminal). An input aspect of the user I/O device 118 allows the user to provide information to the user device 110, and may include, for example, a mechanical keyboard, a touchscreen, a microphone, a camera, a fingerprint scanner, any user input device engageable to the user device 110 via a USB, serial cable, Ethernet cable, and so on. An output aspect of the user I/O device 118 allows the user to receive information from the user device 110, and may include, for example, a digital display, a speaker, illuminating icons, LEDs, and so on. The user I/O device 118 may include systems, components, devices, and apparatuses that serve both input and output functions, allowing the provider institution computing system 130 exchange information with the user device 110. Such systems, components, devices and apparatuses include, for example, radio frequency transceivers (e.g., RF or NFC-based transceivers) and other short range wireless transceivers (e.g., Bluetooth, laser-based data transmitters, etc.).

The user device 110 can also include a GUI integration circuit 112. The GUI integration circuit 112 can be structured to present, control, and otherwise manage displays or graphical user interfaces on the user device 110 including information pertaining to data stored and generated by the provider institution computing system 130. For example, the GUI integration circuit 112 may present the user with displays facilitating the input of information pertaining to various transactions. The screens may cause the user to manually input information in response to various prompts. The GUI integration circuit 112 may then process the information input by the user, and transmit the information to the provider institution computing system 130 for storage (e.g., in the provider institution accounts database 132 in association with the user). In some arrangements, the GUI integration circuit can be or can include a web browser configured to display a web-based user interface provided by the provider institution computing system 130. Additional aspects of the interfaces that can be displayed on the user device 110 by the GUI integration circuit 112 are described further below.

Application 116 can be structured to provide the user with access to services offered by the provider institution. In some arrangements, the application 116 can be hard coded onto the memory of the user device 110. In another embodiment, the application can be web-based interface applications, where the user logs onto or accesses the web-based interface before usage, and the application 116 can be supported by a separate computing system comprising one or more servers, processors, network interface circuits, or the like, that transmit or provide the application 116 for use to the user device 110.

In some arrangements, the application 116 can be structured to permit management of at least one user account associated with a provider institution. Accordingly, the application 116 can be communicably coupled to the provider institution computing system 130 via the network 170. Through this communicative coupling, the provider institution computing system 130 may be configured to provide displays (e.g., via the transaction processing circuit 136) regarding the particular provider institution service or application 116 (e.g., transaction information 117).

In some embodiments, the application 116 can be an independent application accessed by the user of the user device 110 when the user wants to submit or review transaction information. In other embodiments, the application 116 can be embedded in or otherwise incorporated in another application. In some embodiments, the application 116 can be a feature, application, or component of a mobile wallet. When the user accesses the mobile wallet on the user device 110 to pay for a transaction, the application 116 can initiate and prompt the user to begin submitting information or capturing images as described herein. The application 116 can, for example, automatically initiate when the mobile wallet is accessed, or the user can choose to activate the application 116 by selecting an interaction point within the mobile wallet application. In another embodiment, the application 116 can be a part of a provider institution application. For example, a bank can have a banking application. The application 116 can be configured to be accessible through (or incorporated in) the banking application. Similar to the mobile wallet, if a user uses the banking application to complete a transaction, the application 116 can automatically initiate when the banking application is activated, or the user can choose to activate the application 116 by selecting an interaction point within the banking application.

The provider institution computing system 130 can be a computing system associated with an organization, such as a financial institution, that provides and maintains one or more accounts, which may include financial accounts (e.g., demand deposit account, credit or debit card account, brokerage account, etc.) on behalf of the user. In some arrangements, the provider institution can be an issuer of a payment vehicle held by the user. In the context of the present disclosure, the provider institution can include commercial or private banks, credit unions, investment brokerages, mobile wallet providers, and so on, but can also include any commercial entity capable of maintaining payment vehicles on behalf of a user, including retailers, vendors, service providers, and the like.

The provider institution computing system 130 includes a provider institution accounts database 132, a user interface circuit 134, a transaction processing circuit 136, and a provider institution network circuit 138 enabling the provider institution computing system 130 to exchange data over the network 170. In some arrangements, the user interface circuit 134 can, for example, include an API that facilitates the delivery of account information, identity information, or other information for display at the user device 110. The provider institution accounts database 132 can be structured to retrievably store user information relating to the various operations discussed herein. The provider institution accounts database 132 may include non-transient data storage mediums (e.g., local disc or flash-based hard drives, local network servers, and the like) or remote data storage facilities (e.g., cloud servers). The provider institution accounts database 132 may include personal information (e.g., names, addresses, phone numbers, etc.), transaction information (e.g., date, time, location, service/product rendered, value, etc.), authentication information (e.g., username/password combinations, device authentication tokens, security question answers, unique customer identifiers, etc.), and financial information (e.g., token information, account numbers, account balances, available credit, credit history, transaction histories, etc.) relating to the various users and associated financial accounts.

The transaction processing circuit 136 can be structured to collect, update, and analyze information received from a user of the user device 110 to verify the user of the user device 110. For example, the transaction processing circuit 136 can collect, update, and analyze information based on inputs received from the user device 110 via the network 170. In some arrangements, the transaction processing circuit 136 can be configured to generate a graphical representation of various interfaces to prompt a user of the user device 110 to provide or verify data corresponding to a transaction. The graphical representation may be encoded with hypertext that facilitates the user of the user device 110 communicating responses to various prompts to the provider institution computing system 130 over the network 170.

In some embodiments, the transaction processing circuit 136 may be configured to store, include, or otherwise provide transaction information (i.e., in a transaction database 140). The transaction database 140 may be configured to store transaction information and data of a plurality of transactions. In some embodiments, the transaction processing circuit 136 may be configured to populate the transaction database 140 with data received from a user (i.e., data entered by the user to the user device 110 during the transaction). For example, inputs provided by the user to the user device 110 may be transmitted from the user device 110 to the provider institution computing system 130 for storage in the transaction database 140. In some embodiments, the transaction processing circuit 136 may be configured to populate the transaction database 140 with data provided by the third party computing systems 160. For example, the third party computing systems 160 may be configured to transmit, send, or otherwise provide a receipt, bill of sale, or other transaction information to the provider institution computing system 130 for storage in the transaction database 140. In another embodiment, the transaction processing circuit 136 may be configured to populate the transaction database 140 with data extracted from images of the transaction. For example, a user can take a picture of a receipt from the transaction and the transaction processing circuit 136 can pull information regarding the total value, merchant, items purchased, date, etc. from the receipt. For example, the transaction processing circuit 136 can perform optical character recognition (OCR). OCR can, for example, convert any typed, handwritten, or printed text into machine-encoded text so the transaction processing circuit can "read" the receipt. Additionally, if the user captures an image of the items purchased in the transaction, the transaction processing circuit 136 can recognize the product and store the type of product in the transaction database 140. In some embodiments, the transaction processing circuit 136 may be configured to receive an electronic receipt for the transaction. For example, the transaction processing circuit 136 may access an application program interface (API) for an email application associated with the customer. The transaction processing circuit 136 may request or otherwise receive an electronic receipt which was emailed to an email account of the customer from the email application. The transaction processing circuit 136 may be configured to parse the electronic receipt to extract the transaction details for storage in the transaction database 140.

Third party computing systems 160 are computing systems associated with various third parties. As used herein with respect to third party computing systems 160, "third parties" refer to organizations or entities that may also be associated with a transaction involving the user of the user device 110. For example, the third party computing systems 160 can be a merchant involved in a transaction associated with the user, or a party associated with (e.g., owned or otherwise used by) the merchant, a third-party individual who is selling an item involved in a transaction, and so forth.

Third party computing systems 160 can include a transaction database 162, a camera 164, and a third party network circuit 166 that facilitates the exchange of data, information, values, and the like over the network 170. The transaction database 162 can be structured to retrievably store transaction information relating to transactions made between the third party and the user. The transaction database 162 may include non-transient data storage mediums (e.g., local disc or flash-based hard drives, local network servers, and the like) or remote data storage facilities (e.g., cloud servers).

The camera 164 can be configured to capture images of transactions made between the third party and the user. For example, the images can be of the user, the merchant, products purchased or services rendered, or anything else involved in the transaction. The camera 164 can be configured to be operated manually or automatically. For example, the camera 164 can be stationed near a cash register at a store and can automatically capture images as a user is purchasing items. Alternatively, the camera 164 can require an operator to actuate the camera 164 to capture images. The images captured by the camera 164 can be stored in the transaction database 162 and linked to the corresponding transaction. For example, an image can be timestamped and linked in the transaction database 162 with a transaction occurring at substantially the same time, as described in greater detail below.

In some arrangements, multiple users can use separate user devices 110 during the same transaction. For example, both a customer and a merchant can be using their own user device 110 while completing a transaction. The transaction processing circuit 136 can be configured to collect the data from both user devices 110 and can link the data from both user devices 110 to the same transaction (e.g., for storing in the transaction database 140). Even without using a user device 110, the third party (e.g., the merchant) can still collect transaction information corresponding to the user of the user device 110. For example, the third party computing system 160 can include a camera 164 to collect images of the transaction. The third party computing system 160, via the third party network circuit 166, can be configured to transmit, send, or otherwise provide the images to the provider institution computing system 130 (i.e., with other transaction information which represents the transaction between the merchant and the customer). The transaction processing circuit 136 may be configured to store the images in the provider institution accounts database 132 and/or in the transaction database 140.

In some arrangements, the provider institution accounts database 132 can store data corresponding to a plurality of transactions associated with an account of a user in the transaction database 140 and/or in the provider institution accounts database 132. The data for each transaction can include images, transaction information (e.g., date, time, location, service rendered/product sold, value or cost, etc.), other information input by the user (e.g., comments about services rendered or products purchased) and a transaction designation.

The transaction processing circuit 136 can include an image analysis sub-circuit 136a and a transaction linking sub-circuit 136b. In one embodiment, as the transaction processing circuit 136 collects images from various sources, the image analysis sub-circuit 136a can be configured to filter the images based on picture quality and/or images which are relevant to the transaction. For example, the image analysis sub-circuit may be configured to perform facial recognition to detect user(s) represented in the image. As another example, the image analysis sub-circuit may be configured to perform object detection to detect objects (i.e., items) purchased in the image. The image analysis sub-circuit 136a may be configured to store, include, or otherwise provide images which include detected user(s) and/or detected objects for storage in the accounts database 132 and/or the transaction database 140. In some embodiments, the image analysis sub-circuit 136a may be configured to filter images based on image quality. For example, if some of the images captured during a transaction are blurry and the features in the image are indistinguishable (e.g., the customer cannot be recognized), the image analysis sub-circuit 136a can be configured to remove the image from the provider institution accounts database 132 and/or transaction database 140. In some embodiments, the image analysis sub-circuit 136a may be configured to analyze image(s) received from the camera(s) 114, 164 in real-time or near real-time (i.e., during the transaction and/or subsequent to the transaction). The image analysis sub-circuit 136a may be configured to identify users and/or objects from the image as the transaction is taking place and/or shortly after the transaction has taken place. Such implementations and embodiments may provide for real-time or near real-time fraud detection, as described in greater detail below.

Once the provider institution computing system 130 receives data corresponding to a transaction (i.e., from the third party computing system 160 and/or from the user device 110) and the image analysis sub-circuit 136a has identified users and/or objects from the images, the transaction linking sub-circuit 136b of the transaction processing circuit 136 can be configured to link together the transaction data and the images as being associated with the same transaction. For example, the provider institution computing system 130 can receive data from a third party computing system 160 and data from a user device 110. Based on the details provided in that data (e.g., date, time, location), the transaction linking sub-circuit 136b can determine which data relates to the same transaction. For example, the third party computing system 160 can provide the provider institution computing system 130 an image of a transaction with a timestamp of 12:30:05 on Jan. 1, 2021, and the third party computing system 160 can be associated with Store 1. If the user device 110 provides an image of a transaction made at Store 1 (based on a comparison of metadata from the image which includes or specifies a location which is shared with Store 1) with the same or similar timestamp, the transaction linking sub-circuit 136b can determine those images are from the same transaction. The transaction linking sub-circuit 136b may be configured to detect images and transaction data from separate systems/devices having timestamps which are substantially the same and take place at a common or shared location. The transaction linking sub-circuit 136b may be configured to link the images and the transaction data by generating a unique identifier for the transaction, and storing the images and transaction data in the accounts database 132 and/or the transaction database 140 in association with the unique identifier.

Following linking the transaction data and the images, the image analysis sub-circuit 136a can be configured to analyze the data for the transaction to generate the transaction designation. The image analysis sub-circuit 136a can be configured to analyze the data associated with the transaction received from the user of the user device 110 and any corresponding third party computing system 160. The designation can be one of verified or unverified, depending on the analysis of the data received. Verified refers to a transaction in which the image analysis sub-circuit 136a receives images which include features which match one or more factors relating to the customer or the goods/services purchased in the transaction. Unverified refers to a transaction in which the image analysis sub-circuit 136a receives images which include features which do not match one or more factors relating to the customer or the goods/services purchased in the transaction. As such, in the context of an unverified transaction, the features not matching the one or more factors may be indicative of a potentially fraudulent transaction. For example, the image analysis sub-circuit 136a can be configured to analyze images received from any user device 110 and any third party computing system 160 and determine whether features corresponding to the customer in the images correspond to the user (e.g., determine if the customer in the images is the user). For example, the image analysis sub-circuit 136a can include a facial recognition system. The facial recognition system can be configured to perform facial recognition by comparing a face in the images received to a picture of the user. The picture of the user can, for example, be supplied to the provider institution computing system 130 by the user via an account the user has with the provider institution (e.g., upload a picture to a profile the user has with the provider institution), or the picture can be retrieved by the provider institution from another account associated with the user that is linked to the account with the provider institution (e.g., provider institution uses a picture from a social media account the user has linked to the provider institution account). If the face captured in the images matches the face of the user in the picture, the transaction processing circuit 136 can be configured to generate a verified designation for the transaction since matching the face in the images with the face of the user in the picture can indicate that the user was involved in the transaction. If the face captured in the images does not match the face of the user in the picture, the transaction processing circuit 136 can be configured to generate an unverified designation for the transaction since not matching the face in the images with the face of the user in the picture can indicate the user was not involved in the transaction. The transaction processing circuit 136 can also analyze the images for other distinguishing features that can identify an individual (e.g., tattoos, scars).

The image analysis sub-circuit 136a can also be configured to analyze images received from any user device 110 and any third party computing system 160 and determine whether features corresponding to the goods purchased or services rendered in the images match the transaction information (e.g., the goods in the images are the goods listed on a receipt). For example, the image analysis sub-circuit 136a can be configured to compare images of goods or services with the goods or services specified in the transaction information. In some embodiments, the image analysis sub-circuit 136a may be configured to access a library or database which identifies objects corresponding to various goods or services which may be purchased. The library may be a global library (i.e., a standard library used for a plurality of merchants/stores/establishments/etc.). The library may be specific to the merchant or third party (such as a website including images of goods offered by the merchant/third party, a merchant specific or merchant-type specific library, etc.). The image analysis sub-circuit 136a may be configured to compare the images from the library to the images received from the camera(s) 114, 162 to generate a designation for the transaction. As one example, if the images include a picture of a computer and the transaction information identifies a computer was bought, the transaction processing circuit 136 can generate a verified designation for the transaction. On the other hand, if the images include a picture of a computer and the transaction information identifies food was bought, the transaction processing circuit 136 can be configured to generate an unverified designation for the transaction. As yet another example, if the images include a picture of a single gallon of milk and the transaction information identifies two gallons of milk were purchased, the transaction processing circuit 136 may be configured to generate an unverified designation for the transaction.

In some embodiments, designation of the transaction can occur prior to or simultaneously with the processing of payment of a transaction. If a designation of unverified is determined prior to completing payment, the application 116 can prevent the transaction from being completed. For example, the image analysis sub-circuit 136a can detect potential fraud and designate a transaction as unverified if the image of the customer does not match the picture of the user. If payment has not been processed prior to this designation, the transaction processing circuit 136 can prevent the payment from being completed by, for example, deactivating a credit card or putting a freeze/hold on an account. If the user is a party to the transaction and the designation is wrong, the user can override the deactivation or freeze by inputting an authentication factor to prove that the customer is the user (e.g., account password, answer to security question, etc.).

After designating a transaction, the transaction processing circuit 136 can be configured to update the provider institution accounts database 132 to include the designation. The transaction processing circuit 136 can be configured to generate a user interface via the user device 110 alerting the user that a designation has been made. For example, if the designation for a transaction is an unverified designation, the transaction processing circuit 136 can generate a user interface via the user device 110 alerting the user that features in the images received do not correspond to the user (or goods shown in the transaction information are not shown in the images). The user interface can provide all of the information associated with the transaction to the user and can provide fields for the user to input a response. For example, if the user verifies all the details of the transaction and agrees that the features depicted in the image do not correspond to the user, the user can file a fraud claim via the user interface. With all the transaction details already in the provider institution accounts database 132, a fraud claim request can automatically populate with the details and images of the transaction and submitting the fraud claim can include forwarding all the information and images to the receiving party (e.g., to a fraud computing device of the provider institution computing system 130). In some embodiments, submitting a fraud claim can include the user providing additional comments or leaving a voice message for the provider institution regarding the fraud claim. If the user disagrees with the designation and thinks the features depicted do correspond to the user, or to someone the user has authorized, the user can update the designation to verified.

In some embodiments, the application 116 (independent or embedded in another application) can be configured to automatically activate (or be manually activated by the user of the user device 110) for every transaction (i.e., every transaction may include a designation which is based on images of the transaction). In some embodiments, the application 116 can be configured to activate when one or more transaction details of the transaction satisfies a threshold. For example, a threshold can be or include a threshold total dollar amount of the transaction (e.g., at least $200), a threshold number of items bought (e.g., at least 5 items), and/or a type of good or service rendered (e.g., electronics—television, computer, etc.). Such thresholds may be default values, selected by a user or account holder, etc. If the threshold is satisfied, the application 116 can be automatically activated to generate a designation for the transaction (or for obtaining data for the transaction processing circuit 136 to generate the designation). In some embodiments, if the threshold is a threshold total dollar amount of $200 and the transaction is less than $200, the user can still capture images (i.e., using user device 110) and those images can be stored, but the application 116 can be configured to forego image processing.

Figure 2:
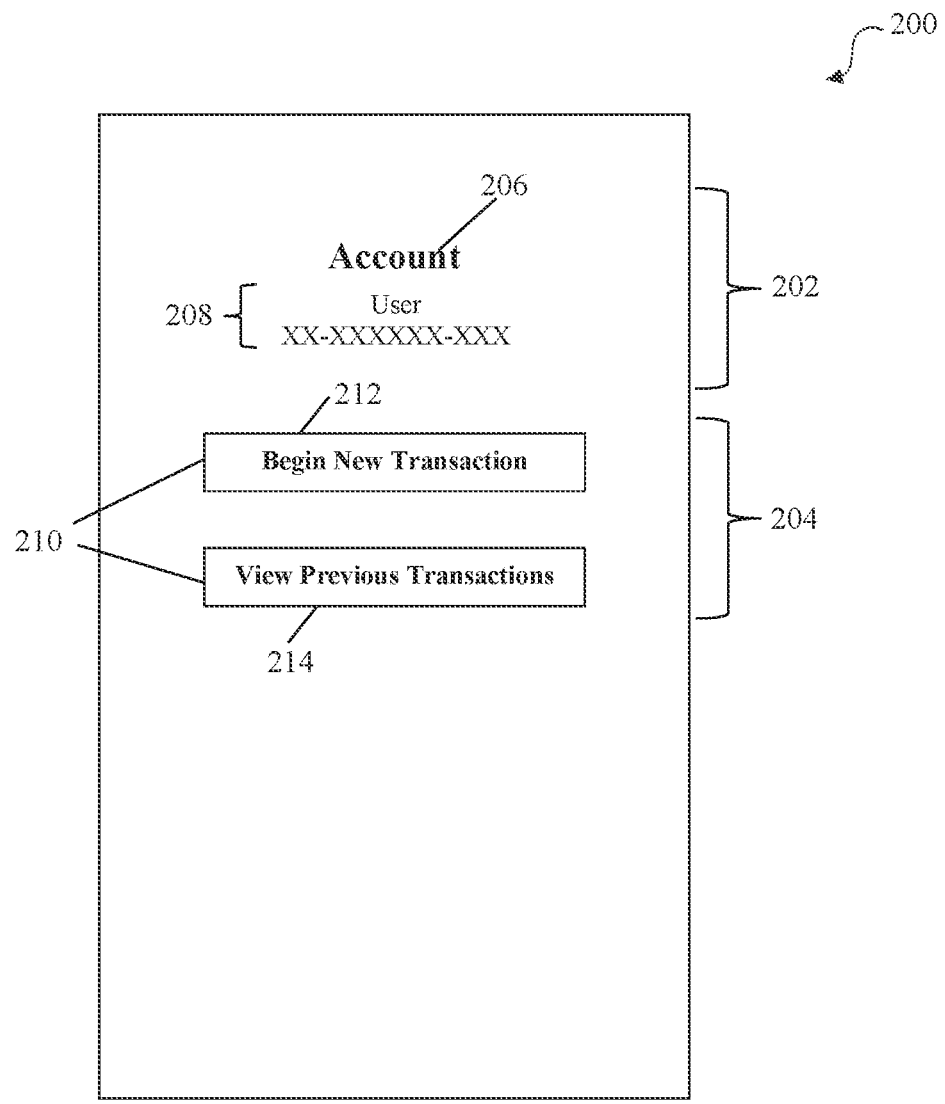
FIG. 2 depicts an exemplary user interface, according to an example embodiment.

Now referring to FIG. 2, an exemplary user interface 200 is shown according to an example embodiment. The user interface 200 can be presented to a user of the user device 110 to facilitate providing information to be stored by the provider institution computing system 130 corresponding to a transaction. The user interface 200 may be rendered on the user device 110 while the user device 110 is accessing the application 116. The user interface 200 can request various inputs from the user. The user interface 200 can include an information area 202 and an action area 204. The information area 202 displays a header 206 for the interface and associated information 208. The header 206 can be a title of the user interface 200 (e.g., "Account"), generally informing the user what information the user interface 200 is displaying or what actions the user can take via the user device 110 from the user interface 200. The associated information 208 can include, for example, an account number and the name of the owner of the account, among other information. The action area 204 can include at least one interaction point 210. For example, the at least one interaction point 210 can be a selectable "Begin New Transaction" button 212 allowing the user to begin inputting data regarding a new transaction. Responsive to the user selecting the interaction point 210, a new user interface 300 can be displayed on the user device 110. There may also be additional interaction points 210 (e.g., "View Previous Transactions" button 214) where if selected, can cause the user device 110 to display a different interface (e.g., user interface 700).

Figure 3:
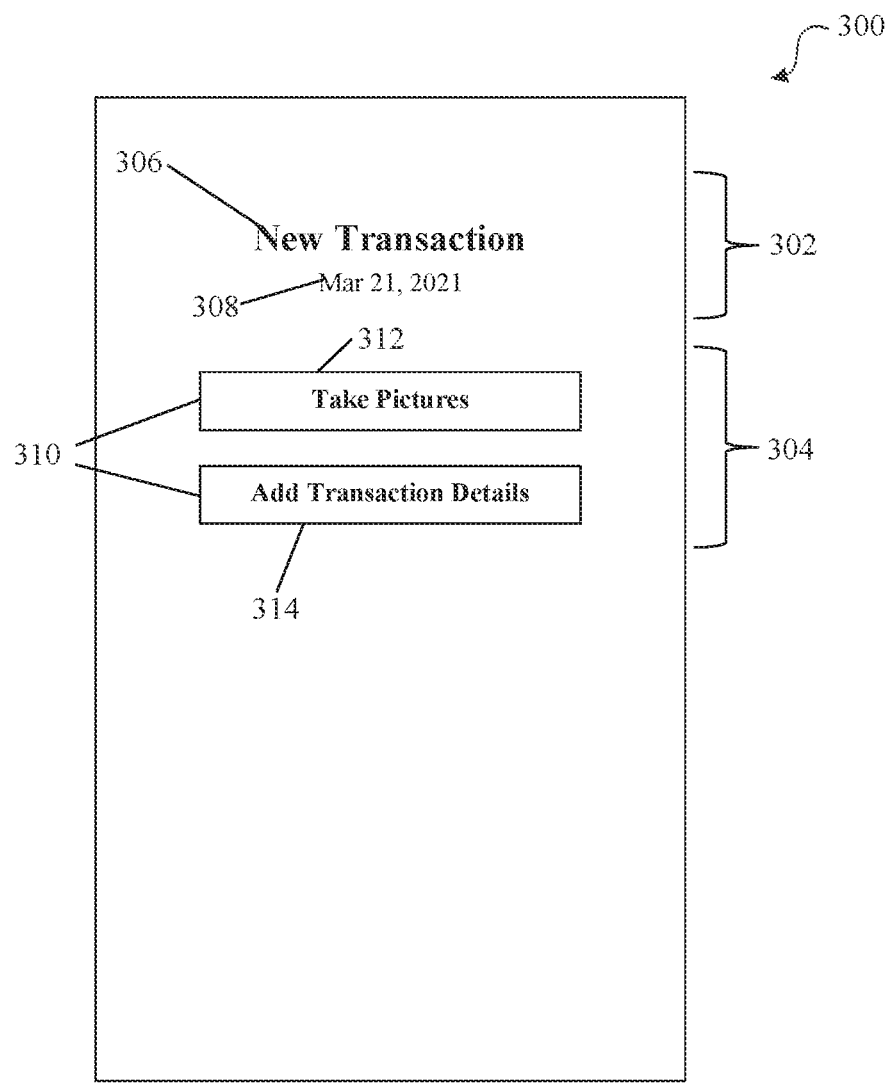
FIG. 3 depicts an exemplary user interface, according to an example embodiment.

Referring now to FIG. 3, an exemplary user interface 300 is shown according to an example embodiment. In some arrangements, the user interface 300 can be displayed upon selection of the "Begin New Transaction" button 212 from user interface 200 of FIG. 2. The user interface 300 can be presented to a user of the user device 110 to prompt the user to provide information to be stored by the provider institution computing system 130 corresponding to a new transaction. The user interface 300 can be presented on the user device 110 while the user device 110 is accessing the application 116. The user interface 300 can request an input from the user. The user interface 300 can include an information area 302 and an action area 304. The information area 302 can display a header 306 for the user interface 300 and associated information 308. The header 306 can be a title of the user interface 300 (e.g., "New Transaction"), generally informing the user what information the user interface 300 is displaying or what actions the user can take via the user device 110 from the user interface 300. The associated information 308 can include, for example, the date the new transaction is being recorded, among other information. The associated information may also include time, location, transaction number or identifier, and the like. The action area 304 can include at least one interaction point 310. The at least one interaction point 310 can allow the user to input information regarding the new transaction.

In some arrangements, user interface 300 can have a plurality of interaction points 310. For example, a first interaction point can be a selectable "Take Pictures" button 312, and a second interaction point can be a selectable "Add Transaction Details" button 314. In some arrangements, only one of the plurality of interaction points 310 can be selectable at a time. Once the user provides an input for the first interaction point, the second interaction point can then become selectable.

In some arrangements, responsive to the user selecting the "Add Transaction Details" button 314, the user interface circuit 134 of the provider institution computing system 130 can provide a user interface that can prompt the user of the user device 110 to provide information about the transaction. For example, the user can be prompted to input the merchant name, location, date, among other information. In some arrangements, the user interface can also display party information corresponding to one or more parties involved in the transaction. For example, the user interface can display fraud claim and charge back data of a merchant involved in the transaction. The fraud claim and charge back data, or any other information displayed corresponding to the parties of the transaction, can be data collected by the provider institution computing system 130 (e.g., how many transactions in the provider institution accounts database 132 corresponding to the merchant are designated as unverified, have been changed from unverified to verified, have resulted in the submission of a fraud claim, have resulted in a charge back). The data can also be data collected by individual merchants or other third parties (e.g., financial institutions) that monitor fraud claims or other transaction information.

Figure 4:
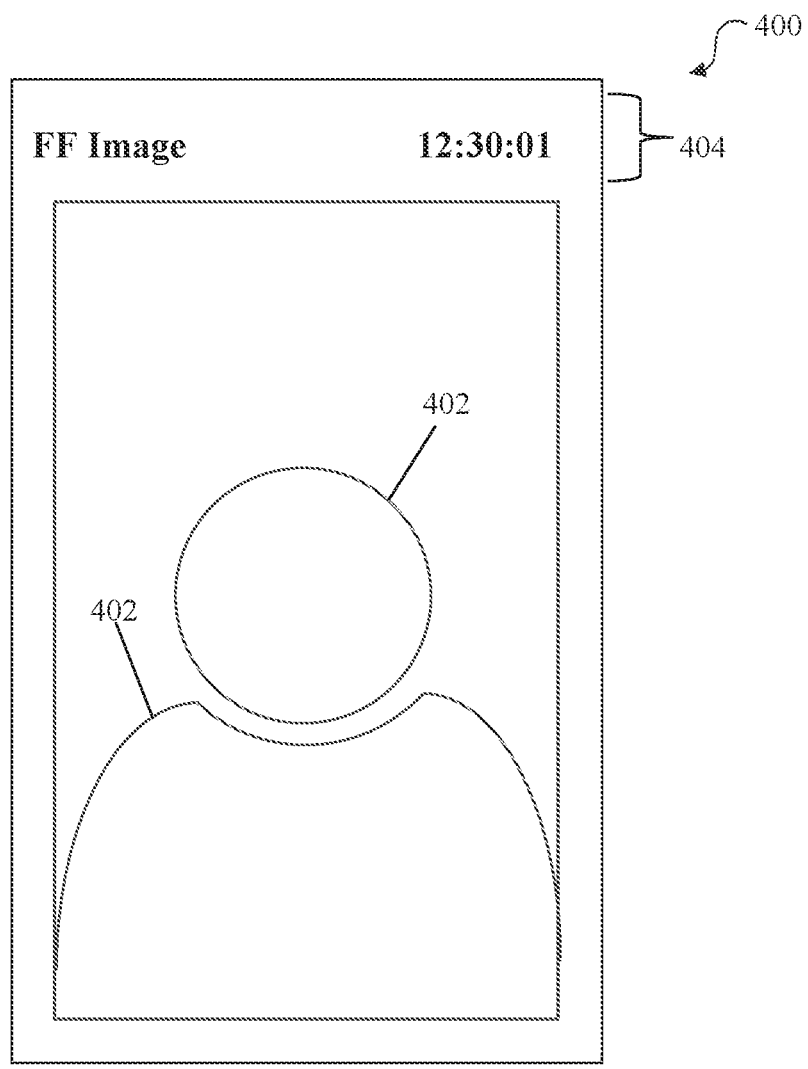
FIG. 4 depicts an exemplary front facing image, according to an example embodiment.

Referring now to FIG. 4, an exemplary front facing image 400 is shown according to an example embodiment. In some arrangements, responsive to selecting the "Take Pictures" button 312, the user device 110 will activate the camera 114 of the user device 110. The camera 114 can be configured to capture at least one front facing image 400. Generally, the at least one front facing image 400 can be an image taken when the camera 114 is directed toward the user. The at least one front facing image 400 can include at least one feature 402 corresponding to the user (e.g., face, clothing, etc.) that can help identify the user as a party involved in the transaction. For example, if the front facing image 400 includes the face of the user, the image analysis sub-circuit 136a of the transaction processing circuit 136 can be configured to perform facial recognition analysis by comparing the front facing image 400 with an image of the user (e.g., image provided by the user to the provider institution computing system 130 or found on a social media platform). If the faces match, the image analysis sub-circuit 136a can automatically determine the person in the image is the user. If the front facing image 400 includes only clothing of the user (or a portion of the face of the user such that the user is only partially visible) or shows a different user, the user can manually review the front facing image 400 and determine if the clothing corresponds to the user, if the portion of the face shown in the image is the user, or if the different user is authorized by the user to participate in the transaction. The front facing image 400 can also include a label 404 providing a title, location, timestamp, and/or other details relevant to the front facing image 400 (e.g., FF Image, time, date, location, etc.). While shown as being a label 404 on the front facing image 400, it is noted that the label may additionally or alternatively be included as metadata of the front facing image 400.

To ensure the user captures images with enough detail to facilitate recognition of the person or product in the images (e.g., the object or person is large enough in the image, the object or person is in the center of the image), the user device 110 can include sensor 113 to indicate to the user when the user device 110 is in an adequate position to capture the image. The sensor 113 may be or include, for example, an inertial measurement unit (IMU), an accelerometer and/or a compass, a level sensor, or any other type of sensor 113. For example, the sensor 113 can be configured to indicate to the user when the user device 110 is positioned at a proper angle (e.g., 20 degrees inclined, 25 degrees inclined, 30 degrees inclined, 35 degrees inclined, 40 degrees inclined, and so forth). For example, the user device 110 can include a gyroscope to detect the angle of inclination. When the user device 110 is inclined at an angle around thirty degrees, the user interface can indicate to the user that the user device 110 is at the proper angle (e.g., make a sound, screen can change color, display angle on the user interface, etc.). In another example, the user interface can provide an outline (e.g., silhouette for a person, box for a product) for the user to align themselves or the product with, respectively. For example, if the user interface includes a silhouette of a person, the user can position the user device 110 such that the image of the user on the user device 110 aligns with the silhouette. If the user interface includes a box, the user can position the user device 110 such that the image of the product aligns with the box. In one embodiment, the user device 110 can automatically actuate the camera(s) 114 once the user device 110 determines that the user or the product is adequately aligned with the outline.

Figure 5:
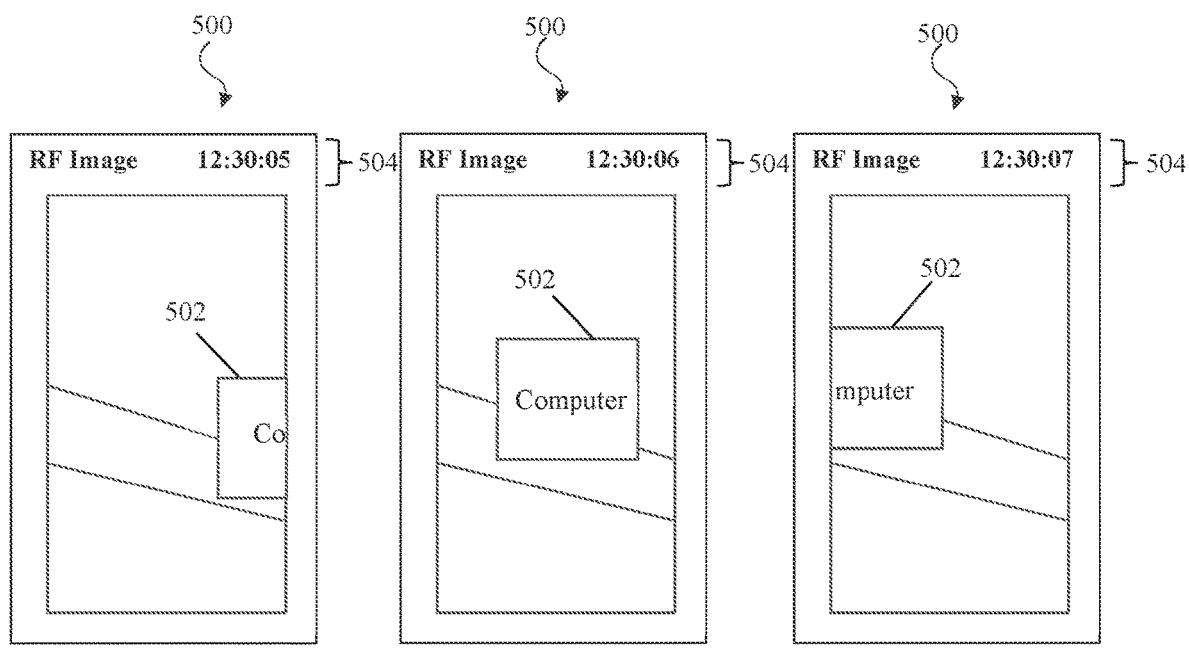
FIG. 5 depicts exemplary rear facing images, according to an example embodiment.

Referring now to FIG. 5, exemplary rear facing images 500 are shown according to an example embodiment. In some arrangements, responsive to selecting the "Take Pictures" button 312, the user device 110 will activate the camera 114 of the user device 110. The camera 114 can be configured to capture at least one rear facing image 500. Generally, the at least one rear facing image 500 can be an image taken when the camera 114 is directed away from the user. The at least one rear facing image 500 can include at least one feature 502 corresponding to the good or service rendered (e.g., the good/service, a receipt, etc.) during the transaction. The rear facing image 500 can also include a label 504 providing a title, location, or time details relevant to the rear facing image 500 (e.g., RF Image, time, date, location, etc.). The sensor 113 can be used for capturing adequate rear facing images 500 in a similar manner as described for the front facing images.

In some arrangements, responsive to selecting the "Take Pictures" button 312, the user device 110 can activate multiple cameras 114 of the user device simultaneously. For example, the user device 110 may be configured to activate multiple cameras 114 to automatically capture images including both front and rear-facing views. In some embodiments, the a user interface of the user device 110 can display a front facing view from a first camera 114 at a bottom of the user interface, and a rear facing view at a top of the user interface (or vice versa). By providing the front and rear facing views on the camera, the user may move the user device 110 into a position such that the user device 110 is situated at a certain angle or elevation to capture acceptable images showing the user and the goods simultaneously. For example, to capture an image including the face of the user and an image including the product purchased, the user device 110 may be positioned and oriented by the user such that the cameras 114 can capture both images at the same time.

Activating multiple cameras 114 simultaneously facilitates the user capturing a front facing image 400 and a rear facing image 500 at the same time. For example, the first camera 114 on the front of the user device 110 and the second camera 114 on the back of the user device 110 can actuate at the same time to capture the images. Each camera 114 can capture one image or multiple images. In another arrangement, the front facing image 400 and the rear facing images 500 can be taken consecutively. For example, the user of the user device 110 can take the front facing image 400 with the rear-facing camera 114, then turn the phone around and use the same rear-facing camera 114. As another example, the user of the user device 110 may take the front facing image 400 with the front-facing camera 114, then switch to the rear-facing camera to capture the rear-facing image.

In some arrangements, the camera 114 can capture a plurality of front facing images 400 and/or rear facing images 500. For example, as shown in FIG. 5, several rear facing images 500 can be captured as a product is moving down a conveyor belt when the user is buying a good from a merchant. The plurality of front facing images 400 or rear facing images 500 can be captured manually (by the user actuating the camera 114 for each image) or automatically via a setting on the camera 114 (e.g., a burst mode which captures a series of images over a predetermined time, such as two seconds, three seconds, five seconds, ten seconds, etc.). The automatic setting on the camera 114 can cause the camera 114 to capture a plurality of consecutive images over a specific amount of time. Once the camera 114 of the user device 110 is activated, the at least one front facing image 400 and the at least one rear facing image 500 can be captured in any order.

Figure 6:
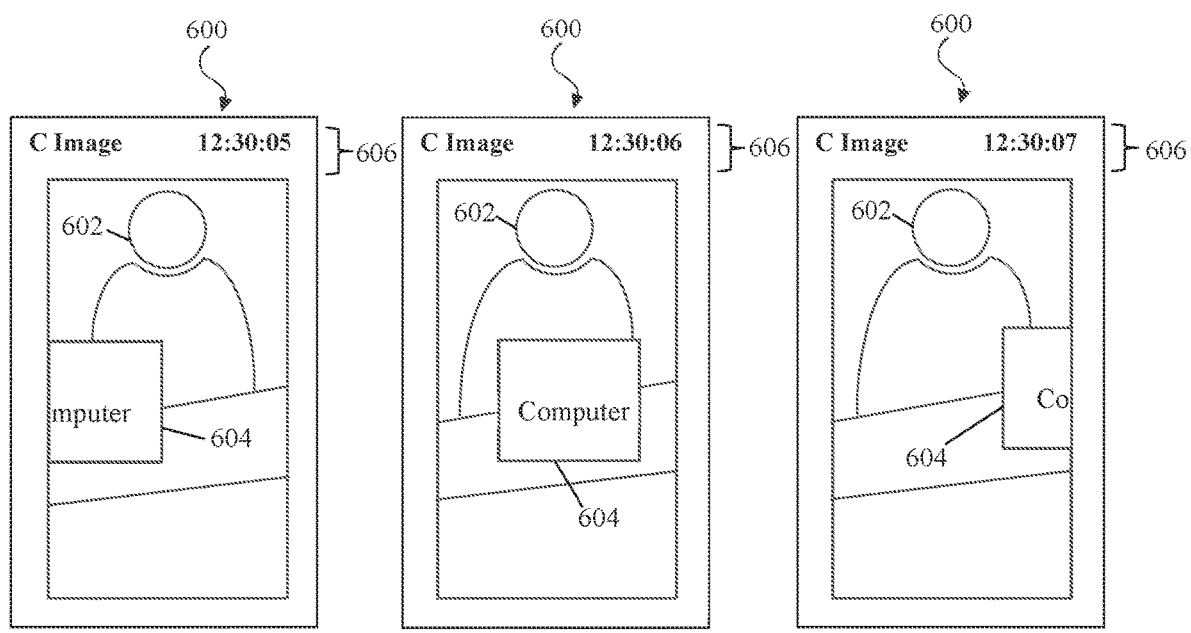
FIG. 6 depicts exemplary customer images, according to an example embodiment.

Referring now to FIG. 6, exemplary customer images 600 are shown according to an example embodiment. In some embodiments, the merchant involved in a transaction can be a user of a second user device 110. For example, while the customer in the transaction uses a user device 110 to capture and send transaction information, the merchant in the transaction can use a second user device 110 to capture and send transaction information. For example, the user device 110 of the merchant may include a camera 114 which is configured to capture a customer image 600 including at least one feature corresponding to the customer 602 and at least one feature corresponding to the good sold or service rendered 604. In another embodiment, the merchant can use a third party computing system 160 to capture and send transaction information. For example, the camera 164 can be configured to capture the at least one customer image 600. The at least one customer image 600 can include at least one feature corresponding to the customer 602 and at least one feature corresponding to the good or service rendered 604. The customer image 600 captured by the camera 114 (e.g., of the merchant user device) or camera 164 of the third party computing system 160 can also include a label 606 providing title, location, and time details relevant to the customer image (e.g., Customer ("C") Image, time, date, location, etc.).

In some arrangements, the camera 114, 164 can capture a plurality of customer images 600. For example, as shown in FIG. 6, several customer images 600 can be captured as a product is moving down a conveyor belt when the customer is buying a good from the merchant. The plurality of customer images 600 can be captured manually (by the merchant actuating the camera 114, 164 for each image) or automatically via a setting on the camera 114, 164 (e.g., burst mode). The automatic setting on the camera 114, 164 can cause the camera 114, 164 to capture a plurality of consecutive images over a specific amount of time.

Figure 7:
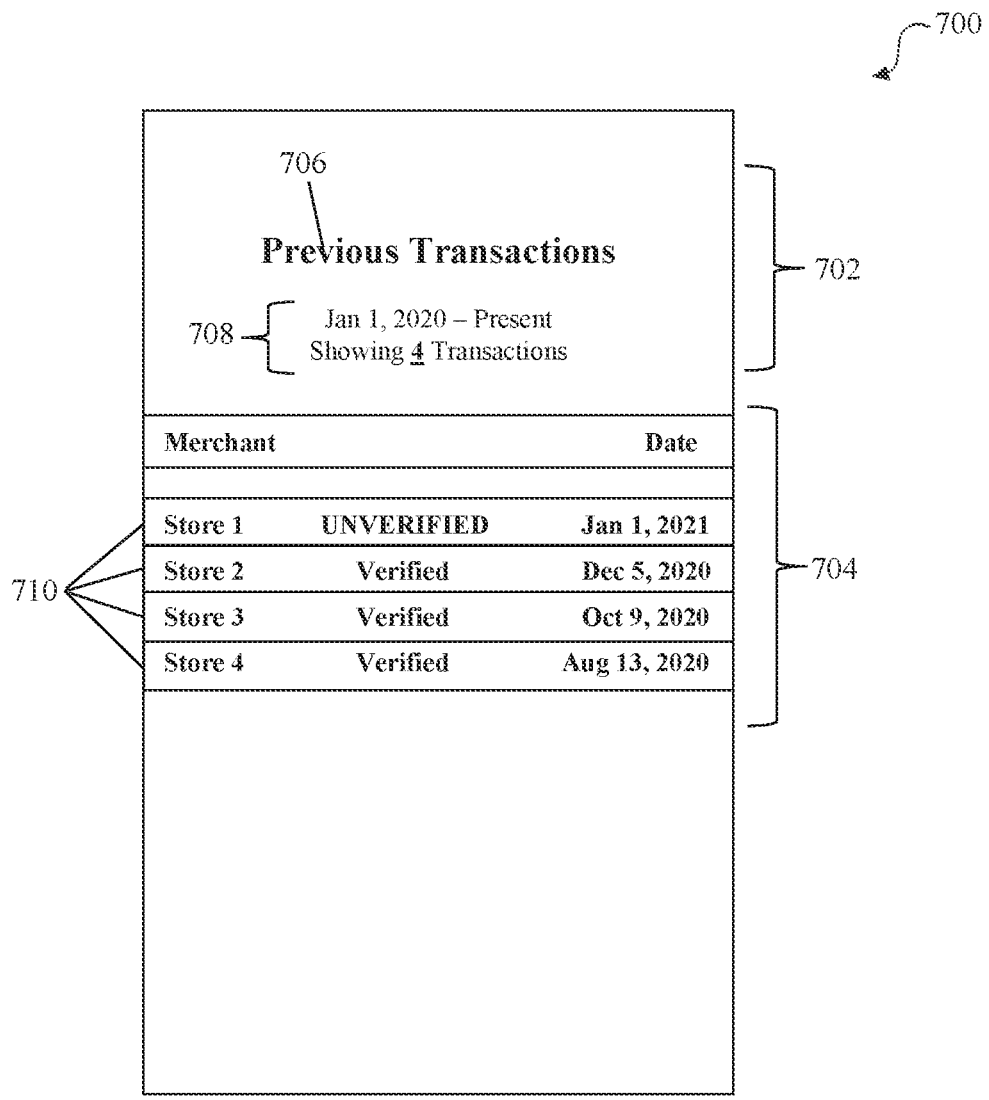
FIG. 7 depicts an exemplary user interface, according to an example embodiment.

Referring now to FIG. 7, an exemplary user interface 700 is shown according to an example embodiment. In some arrangements, the user interface 700 can be displayed upon selection of a "View Previous Transactions" button 214 from user interface 200 (of FIG. 2). The user interface 700 can be presented to a user of the user device 110 to prompt the user to provide or verify information to be stored by the provider institution computing system 130. The user interface 700 can be presented on the user device 110 while the user device 110 is accessing the application 116. The user interface 700 can request an input from the user. The user interface 700 can include an information area 702 and an action area 704. The information area 702 can display a header 706 for the user interface 700 and associated information 708. The header 706 can be a title of the user interface 700 (e.g., "Previous Transactions"), generally informing the user what information the user interface 700 is displaying or what actions the user can take via the user device 110 from the user interface 700. The associated information 708 can include, for example, a date range during which previous transactions took place, among other information. The associated information may also include total quantity of recorded transactions, how many transactions were designated verified versus unverified, and the like. The action area 704 can include at least one interaction point 710. The at least one interaction point 710 can allow the user to input information regarding a previous transaction.

In some arrangements, user interface 700 can have a plurality of interaction points 710. For example, user interface 700 can have an interaction point for every previous transaction recorded. All previous transactions can be organized into a list with one row corresponding to one previous transaction. Each row can include, among other details, the name of the merchant in the previous transaction, the designation of the previous transaction, and the date of the previous transaction. Each row can include an interaction point, the selection of which can trigger or cause presenting of a new interface with more details of the selected previous transaction. For example, if the user selects Store 1 interaction point 710, the user device 110 can display a user interface 800.

Figure 8:
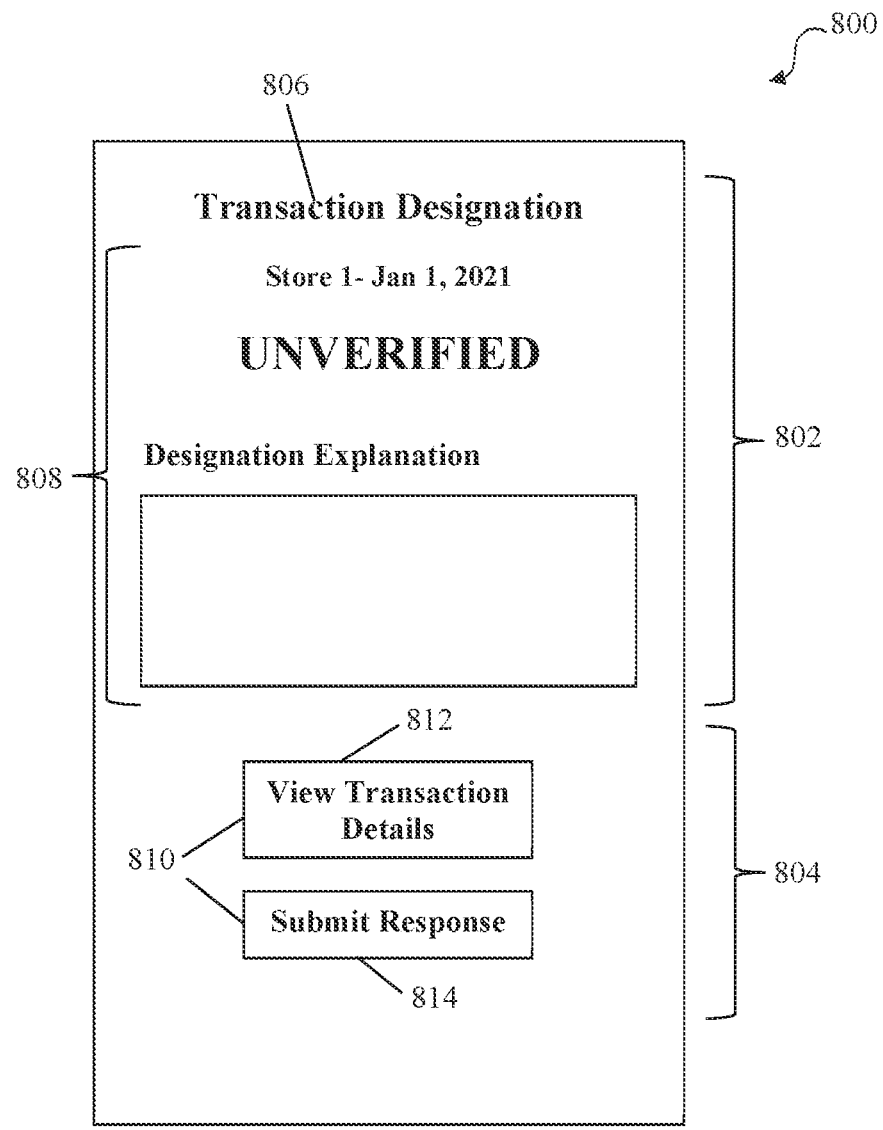
FIG. 8 depicts an exemplary user interface, according to an example embodiment.

Referring now to FIG. 8, an exemplary user interface 800 is shown according to an example embodiment. In some arrangements, the user interface 800 can be displayed upon selection of the corresponding interaction point 710 from user interface 700. The user interface 800 can be presented to a user of the user device 110 to prompt the user to provide or verify information to be stored by the provider institution computing system 130. The user interface 800 can be presented on the user device 110 while the user device 110 is accessing the application 116. The user interface 800 can request an input from the user. The user interface 800 can include an information area 802 and an action area 804. The information area 802 can display a header 806 for the user interface 800 and associated information 808. The header 806 can be a title of the user interface 800 (e.g., "Transaction Designation"), generally informing the user what information the user interface 800 is displaying or what actions the user can take via the user device 110 from the user interface 800. The associated information 808 can include, for example, the merchant, the date of the previous transaction, the designation, and a designation explanation, among other information. The action area 804 can include at least one interaction point 810. The at least one interaction point 810 can allow the user to review or input information regarding the previous transaction.

In some arrangements, user interface 800 can have a plurality of interaction points 810. For example, a first interaction point can be a selectable "View Transaction Details" button 812, and a second interaction point can be a selectable "Submit Response" button 814. In some arrangements, only one of the plurality of interaction points 810 can be selectable at a time. After the user selects a first interaction point 810, a second interaction point 810 can then become selectable. Selection of either button 812, 814 can cause the user device 110 to present a new interface to the user. For example, if the user selects the "View Transaction Details" button 812, the user device 110 can display a user interface 900. If the user selects the "Submit Response" button 814, the user device 110 can display a user interface 1000.

Figure 9:
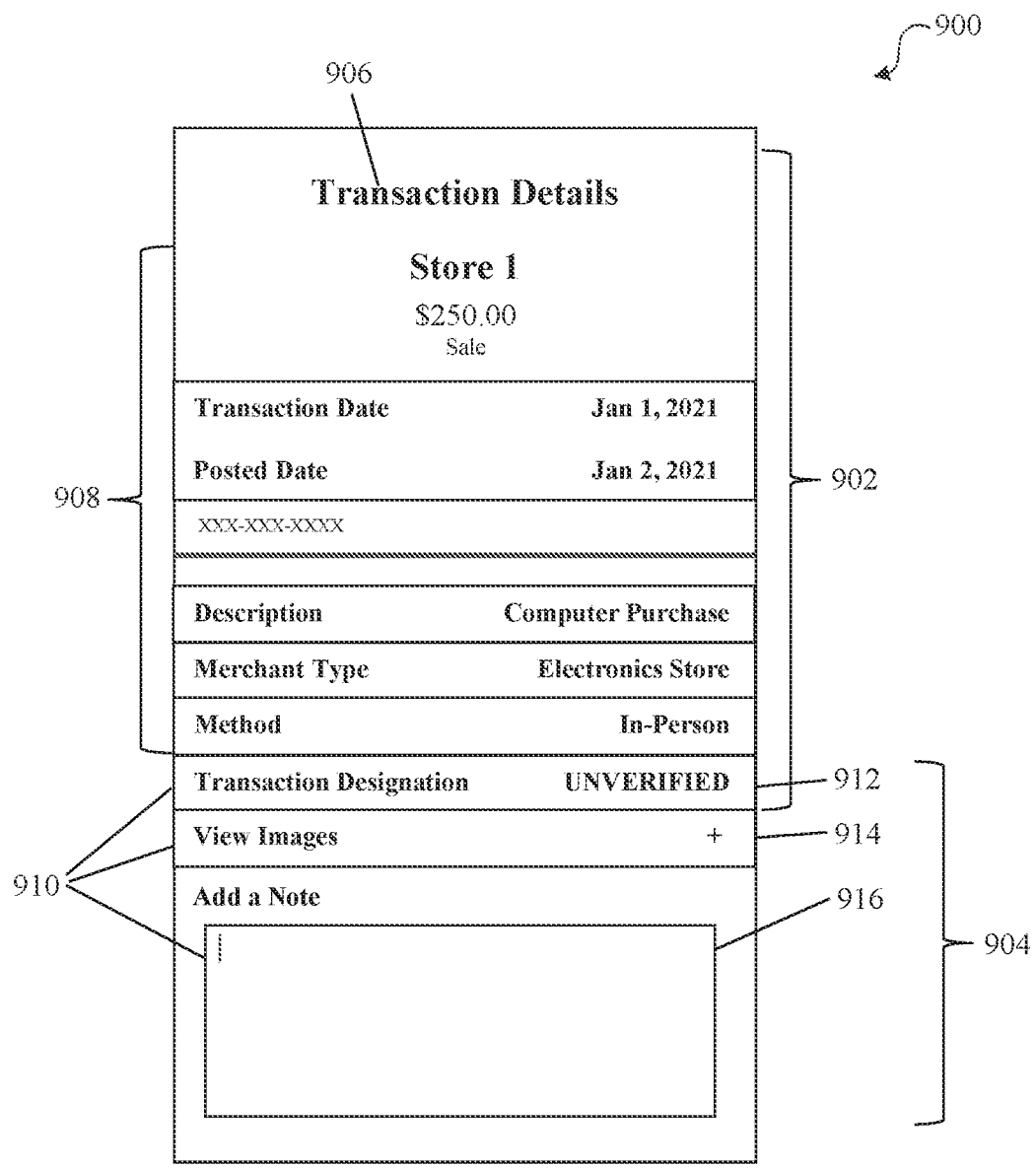
FIG. 9 depicts an exemplary user interface, according to an example embodiment.

Referring now to FIG. 9, an exemplary user interface 900 is shown according to an example embodiment. In some arrangements, the user interface 900 can be displayed upon selection of the corresponding interaction point 810 (e.g., "View Transaction Details" button 812) from user interface 800. The user interface 900 can be presented to a user of the user device 110 to prompt the user to provide or verify information to be stored by the provider institution computing system 130. The user interface 900 can be presented on the user device 110 while the user device 110 is accessing the application 116. The user interface 900 can request an input from the user. The user interface 900 can include an information area 902 and an action area 904. The information area 902 can display a header 906 for the user interface 900 and associated information 908. The header 906 can be a title of the user interface 900 (e.g., "Transaction Details"), generally informing the user what information the user interface 900 is displaying or what actions the user can take via the user device 110 from the user interface 900. The associated information 908 can include, for example, amount, date, location, description, merchant type, designation, source of payment, and method of transaction, among other information. The action area 904 can include at least one interaction point 910. The at least one interaction point 910 can allow the user to review or input information regarding the previous transaction.

In some arrangements, user interface 900 can have a plurality of interaction points 910. For example, a first interaction point can be a selectable "Transaction Designation" button 912, a second interaction point can be a selectable "View Images" button 914, and a third interaction point can be a field 916 in which the user can input text. Selection of the "Transaction Designation" button 912 can cause the user device 110 to display user interface 800. For example, the user can switch between user interface 800 and user interface 900 by alternatingly selecting the "View Transaction Details" button 812 and the "Transaction Designation" button 912 on their respective user interfaces 800, 900. Selection of the "View Images" button 914 can present the user of the user device 110 a new interface or add content to the current user interface 900. For example, if the user selects the "View Images" button 914, the user device 110 can display the images associated with the transaction captured by the cameras 114, 164 of either the user device 110 or the third party computing system 160 (e.g., shown in FIGS. 4-6). The images can be displayed below the "View Images" button 914. In another arrangement, the "View Images" button 914 can cause the user device 110 to display a new user interface including the images submitted. In some arrangements, when the user device 110 presents user interface 900 to the user, the field 916 can be empty or it can include text previously entered by the user. The user can add, remove, or edit text in the field 916 at any time.

Figure 10:
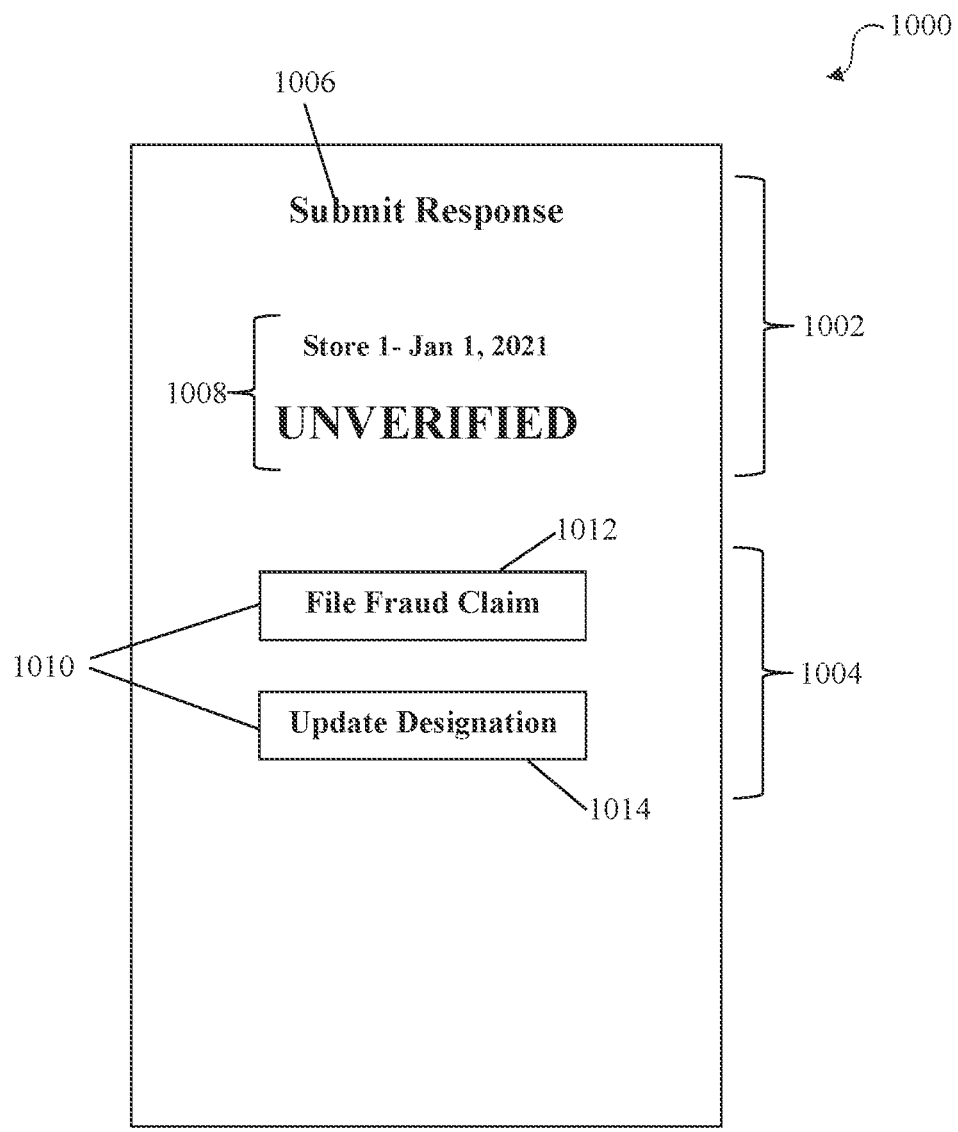
FIG. 10 depicts an exemplary user interface, according to an example embodiment.

Referring now to FIG. 10, an exemplary user interface 1000 is shown according to an example embodiment. In some arrangements, the user interface 1000 can be displayed upon selection of the corresponding interaction point 810 (e.g., "Submit Response" button 814) from user interface 800 of FIG. 8. The user interface 1000 can be presented to a user of the user device 110 to prompt the user to provide or verify information to be stored by the provider institution computing system 130. The user interface 1000 can be presented on the user device 110 while the user device 110 is accessing the application 116. The user interface 1000 can request an input from the user. The user interface 1000 can include an information area 1002 and an action area 1004. The information area 1002 can display a header 1006 for the user interface 1000 and associated information 1008. The header 1006 can be a title of the user interface 1000 (e.g., "Submit Response"), generally informing the user what information the user interface 1000 is displaying or what actions the user can take via the user device 110 from the user interface 1000. The associated information 1008 can include, for example, merchant name, transaction date, and transaction designation, among other information. The action area 1004 can include at least one interaction point 1010. The at least one interaction point 1010 can allow the user to review or input information regarding the previous transaction.

In some arrangements, user interface 1000 can have a plurality of interaction points 1010. For example, a first interaction point 1010 can be a selectable "File Fraud Claim" button 1012, and a second interaction point can be an "Update Designation" button 1014. If, for example, a previous transaction has a designation of unverified, and the user and verifies all associated details and agrees with the designation (e.g., the user was not a party involved in the transaction), the user can select the "Update Designation" button 1014 and verify the designation or select the "File Fraud Claim" button 1012 to begin the process of submitting a fraud claim. If, in the same example, the user does not agree with the designation (e.g., the user was the a party involved in the transaction or otherwise authorized the transaction), the user can select the "Update Designation" button 1014 and change the designation to verified. Once the user completes the steps after selecting either button 1012, 1014, the transaction processing circuit 136 can receive either the fraud claim or the updated designation and update the provider institution accounts database 132 and/or transaction database 140 to reflect the input of the user.

Figure 11:
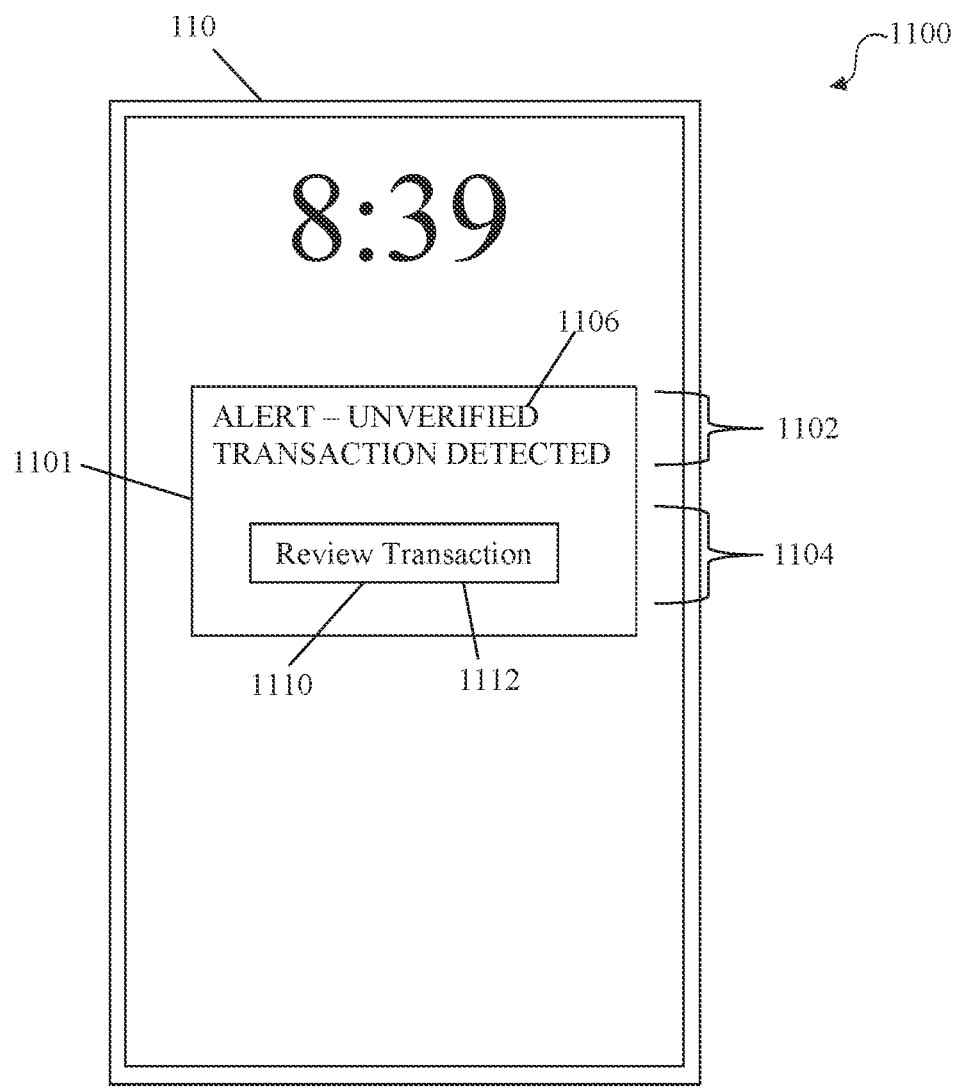
FIG. 11 depicts an exemplary user interface, according to an example embodiment.

Referring now to FIG. 11, an exemplary user interface 1100 is shown according to an example embodiment. In some arrangements, the user interface 1100 can be displayed responsive to the transaction processing circuit 136 of the provider institution computing system 130 providing a designation for a transaction. The user interface 1100 can be presented to a user of the user device 110 to prompt the user to provide or verify information to be store by the provider institution computing system 130. The user interface 1100 can request an input from the user. The user interface 1100 can include features typically displayed on a user device 110 (e.g., time, background image, etc.), as well as a transaction alert 1101. In some embodiments, the transaction alert 1101 may be or include a push notification, a pop-up notification, or other alert which is automatically rendered on the user interface 1100 of the user device 110. The transaction alert 1101 can include an information area 1102 and an action area 1104. The information area 1102 can include a message 1106 for the user. For example, the message 1106 can tell the user that a transaction has been designated as unverified. The information area 1102 can also include more of the information associated with the transaction for the user to review (e.g., location, date, etc.). The action area 1104 can include at least one interaction point 1110. The at least one interaction point 1110 can allow the user to review the information regarding the referenced transaction. For example, the at least one interaction point 1110 can be a "Review Transaction" button 1112. Selecting the "Review Transaction" button 1112 can cause a user interface 900 to be displayed to the user via the user device 110, allowing the user to review the details of the transaction and take further steps as necessary (e.g., view images, add a note, file a fraud claim, change the designation, etc.).

Figure 12:
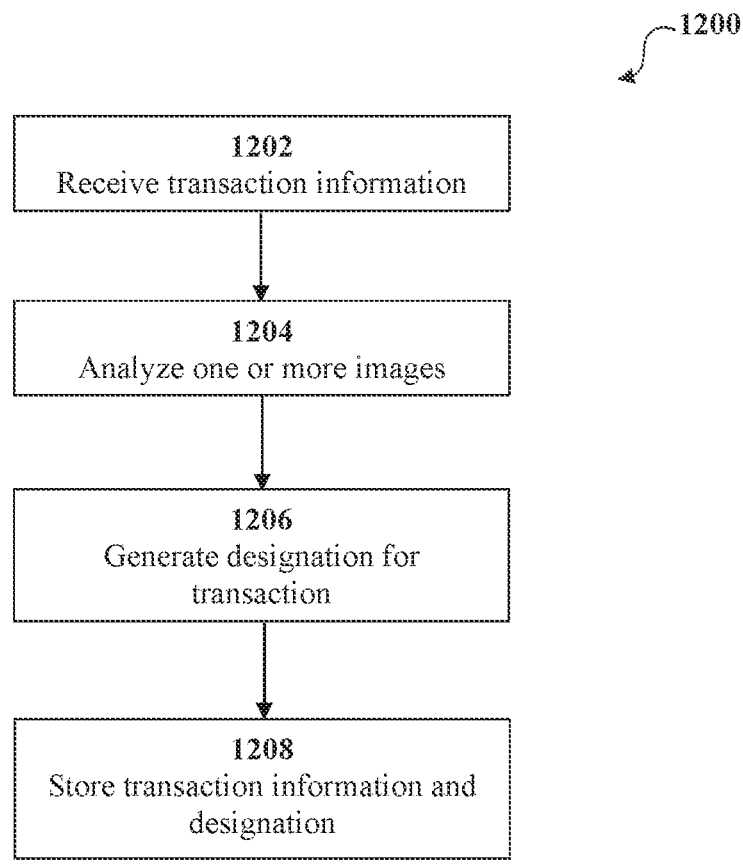
FIG. 12 depicts an exemplary flow diagram of a method of receiving and analyzing data.

Referring now to FIG. 12, depicted is a flowchart showing a method 1200 of receiving and analyzing data corresponding to transactions between a customer and a merchant, according to an example embodiment. The method 1200 can be implemented or performed by one or more of the components described above. As a brief overview, at step 1202, a computing system can receive transaction information. At step 1204, the computing system can analyze one or more images. At step 1206, the computing system can generate a designation for a transaction. At step 1208, the computing system can store the transaction information and designation.

In some embodiments, the computing system can provide party information to the user of the user device 110. The party information can correspond to any party involved in a transaction (e.g., a merchant). The party information can include, for example, fraud claim and charge back data of the merchant (e.g., ratings of the merchant such as "Fraud Claims—0.0001%" or "Charge Backs—0.021%", etc.). Such information may be maintained for the merchant and accessible by, for example, the transaction processing circuit 136. For example, and in some embodiments, the transaction processing circuit 136 may be configured to maintain the fraud claim and charge back data of the merchant based on transaction data from previous transactions of other users having accounts with the provider institution. As another example, a third party may maintain the fraud claim and charge back data of the merchant, and the transaction processing circuit 136 may retrieve such data from a computing device of the third party. The computing system can cause the user device 110 to display a user interface for the user including information regarding the fraud claim or charge back data of the merchant. For example, the user device 110 can display the number of times people have filed fraud claims against the merchant as well as how many times the user has previously filed fraud claims against the merchant, among other information.

At step 1202, the computing system can receive transaction information. In some embodiments, the transaction processing circuit 136 may receive the transaction information provided by the user via the user device 110 during or after completing a transaction. In some embodiments, the transaction processing circuit 136 may receive the transaction information from a third party (e.g., a merchant) computing system 160 provided by the merchant. The transaction information can include, for example, images corresponding to the transaction and other details corresponding to the transaction. The images, for example, can be front facing images captured by a camera facing toward the user and generally includes features corresponding to the user, or rear facing images captured by a camera facing away from the user and generally includes features corresponding to the goods or services rendered. The features corresponding to the user can include, but not limited to, the user's face or clothing. The features corresponding to the goods or services rendered can include, but not limited to, the good or a receipt. The other details corresponding to the transaction can include, but not limited to, the date, time, location, purchase amount, and type of good.

At step 1204, the computing system can analyze the one or more images received by the transaction processing circuit 136 at step 1202. In some embodiments, the transaction processing circuit 136 via the image analysis sub-circuit 136a can perform image processing on images received from the user via the user device 110. The image processing of the images can determine whether the person who participated in the transaction is the user of the user device 110. The image analysis sub-circuit 136a can analyze the images and determine whether features in the images correspond to the user and to the goods or services rendered in the transaction.

At step 1206, the computing system can generate a designation for a transaction. In some embodiments, the transaction processing circuit 136 can generate the designation. Based, at least in part, on the image processing performed at step 1204, the transaction processing circuit 136 can designate the transaction as one of verified or unverified. For example, the transaction processing circuit 136 can generate a verified designation for a transaction if, during the image processing at step 1204, the image analysis sub-circuit 136a can identify features in the images that correspond to the user. The image analysis sub-circuit 136a can determine that the user was a party involved in the transaction based on the one or more features in the images matches one or more features of a stored or accessed image of the user. Alternatively, the transaction processing circuit 136 can generate an unverified designation for a transaction if, during the image processing at step 1204, the image analysis sub-circuit 136a is not able to identify features in the images that correspond to the user.

In some embodiments, generating a designation at step 1206 can also include providing a user interface to alert the user of a user device 110. For example, the user interface can inform the user of the user device 110 that a transaction is designated as unverified. The user interface can include a message 1106. The message 1106 can include the designation for the transaction. The user interface can also include an interaction point 1110. For example, the designation can be unverified and the interaction point 1110 can be a selectable "Review Transaction" button 1112. Responsive to the user of the user device 110 selecting the "Review Transaction" button 1112, the transaction processing circuit 136 can provide a new user interface displaying the transaction details (e.g., user interface 900).

The user interface can also prompt a response from a user via a user device 110. The response can be to any transaction, regardless of designation. For example, if a transaction is designated unverified, the user can submit a response including changing the designation to verified (e.g., if the user was a party involved in the transaction) or submitting a fraud claim. Alternatively, if a transaction is designated verified, the user can submit a response including changing the designation to unverified (e.g., if the user was not a party involved in the transaction) or confirming the verified designation.

At step 1208, the computing system can store transaction information received at step 1202 in a database. In some embodiments, the database can be the provider institution accounts database 132 of the provider institution computing system 130. All the information related to a single transaction can be stored in the provider institution accounts database 132 in an account associated with the user. The transaction information can be retrievably stored in the provider institution accounts database 132 so that the user of the user device 110 can access the transaction information in the future.

Figure 13:
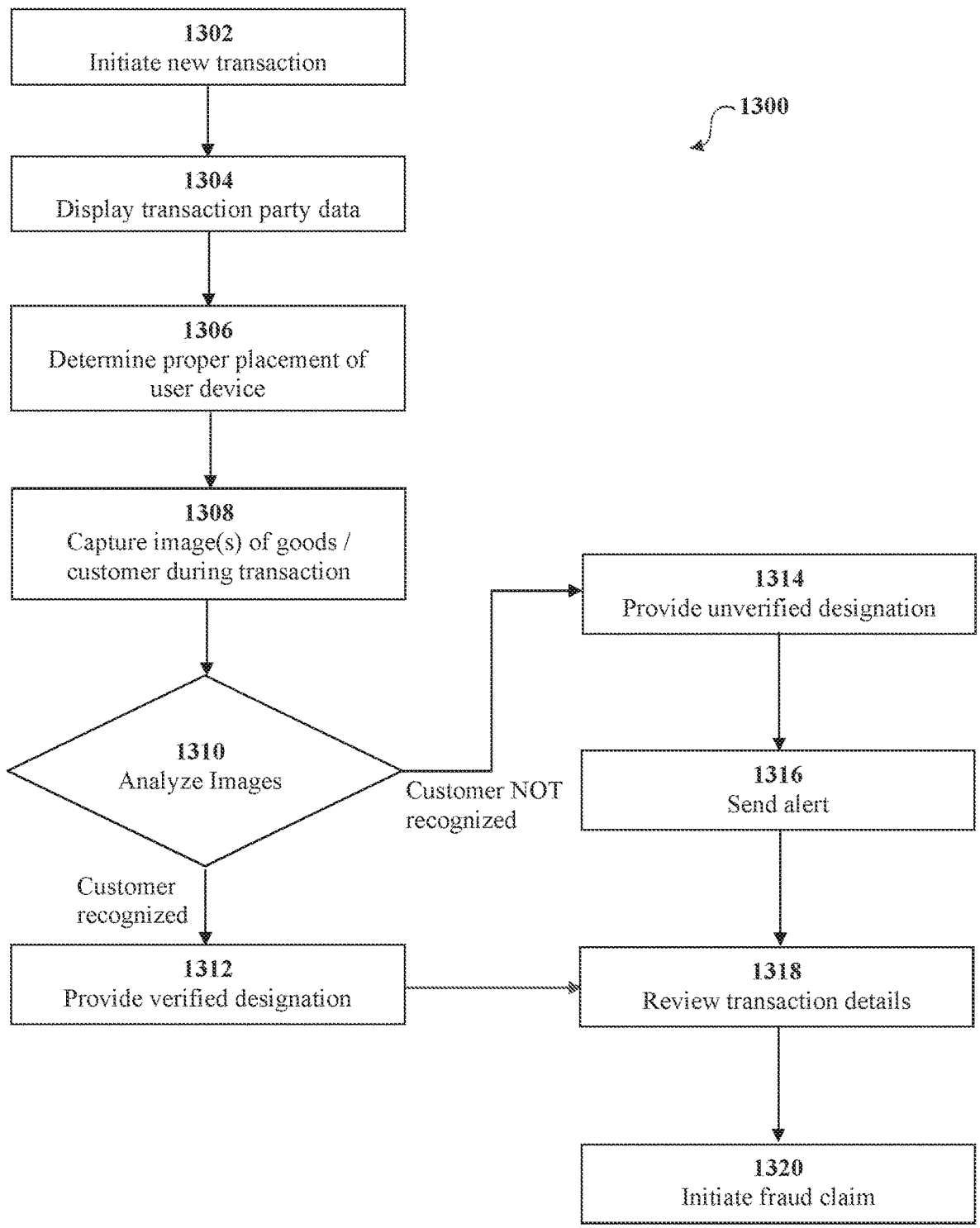
FIG. 13 depicts an exemplary flow diagram of a method of receiving and analyzing data.

Referring now to FIG. 13, depicted is a flowchart showing a method 1300 of receiving and analyzing data corresponding to transactions between a customer and a merchant, according to an example embodiment. The method 1300 can be implemented or performed by one or more of the components described above. As a brief overview, at step 1302, a computing system can initiate a new transaction. At step 1304, the computing system can cause a user interface to display transaction party data. At step 1306, the computing system can determine proper placement of a user device. At step 1308, the computing system can capture image(s) of goods and/or a customer during the transaction. At step 1310, the computing system can analyze the images. If the computing system can recognize the customer in the images, at step 1312 the computing system can generate a verified designation. If the computing system cannot recognize the customer in the images, at step 1314 the computing system can generate an unverified designation and at step 1316 the computing system can send an alert. At step 1318, a user can review transaction details. At step 1320, the user can initiate a fraud claim.

At step 1302, a computer system can initiate a new transaction. In some embodiments, the computing system (e.g., the transaction processing circuit 136) can provide a user interface to a user of a user device 110. The user interface can facilitate capturing images and inputting information correlating to the new transaction. For example, the transaction processing circuit 136 can cause the user device 110 to display user interface 200 with the "Begin New Transaction" button 212. Responsive to the user selecting the "Begin New Transaction" button 212, the transaction processing circuit 136 can provide a new user interface to facilitate collection of data for the new transaction. For example, selecting the "Begin New Transaction" button 212 can cause the transaction processing circuit 136 to cause the user device 110 to display user interface 300. With user interface 300, a user can begin to provide or capture information corresponding to the new transaction.

At step 1304, the computing system can cause the user device 110 to display a user interface including information corresponding to a party participating in the transaction (e.g., a merchant). The information can include, for example, fraud claim and charge back data of the merchant (e.g., ratings of the merchant such as "Fraud Claims—0.0001%" or "Charge Backs—0.021%", etc.). For example, the fraud claim data can include the number of times people have filed fraud claims against the merchant as well as how many times the user has previously filed fraud claims against the merchant, among other information. Displaying the information can also include the transaction processing circuit 136 accessing such information stored by the provider institution, the merchant, or other third parties. For example, a third party can maintain the fraud claim and charge back data of the merchant. The transaction processing circuit 136 can retrieve such data from a computing device of the third party.

At step 1306, the computing system can determine proper placement of a user device 110 to capture an image. In some embodiments, a sensor 113 of the user device 110 can determine when the user device 110 is at a proper angle or elevated at an appropriate height. For example, the user interface of the user device 110 can indicate to the user when the user device 110 is positioned at a proper angle by using a gyroscope. In another example, the user interface can indicate to the user when the person or item is centered and large enough in the image by using an outline. The indication can be, for example, a sound, the screen changing color, displaying the angle on the user interface, etc. In another example, the indication can be that the camera(s) 114 automatically actuates when the user device 110 is in the proper position (e.g., the camera 114 automatically actuates when the user device 110 is at a thirty degree angle or when the user is aligned with the silhouette on the user interface, and so forth).

At step 1308, the computing system can capture one or more images of the good and/or the user during the transaction. In some embodiments, a camera 114 of a user device 110 can capture the one or more images. With the user device 110 in the proper position, the camera(s) 114 can actuate and capture images of the transaction. The images, for example, can be front facing images captured by a camera 114 facing toward the user and generally includes features corresponding to the user, or rear facing images captured by a camera 114 facing away from the user and generally includes features corresponding to the goods or services rendered. The features corresponding to the user can include, but not limited to, the user's face or clothing. The features corresponding to the goods or services rendered can include, but not limited to, the good or a receipt.

Step 1308 can also include multiple user devices 110 capturing images of the same transaction as well as a third party computing system 160 capturing images via camera(s) 164. Images from both cameras 114, 164 generally can include features corresponding to the customer and/or features corresponding to the goods or services rendered.

At step 1310, the computing system can analyze the one or more images captured. In some embodiments, the transaction processing circuit 136 can analyze one or more images captured by the camera(s) 114, 164. The transaction processing circuit 136 can receive the images from the user device 110 and the third party computing system 160 via the network 170. After receipt of the images, the transaction processing circuit 136, via the image analysis sub-circuit 136*a*, can perform image processing on the images received. For example, the image processing of the images can determine whether the person who participated in the transaction is the user of the user device 110. The image analysis sub-circuit 136*a* can also analyze the images and determine whether features in the images correspond to the user and to the goods or services rendered in the transaction.

If the image analysis sub-circuit 136*a* determines the features in the images correspond to the user and the goods or services rendered (e.g., person in images is the user and products in the images are the products bought), the computing system can generate a verified designation at step 1312. If the image analysis sub-circuit 136*a* determines the features in the images do not correspond to the user and the goods or services rendered (e.g., person in images is not the user or products in images were not the product bought), the computing system can generate an unverified designation at step 1314.

At step 1316, with an unverified designation, the computing system can send an alert to the user. In some embodiments, the transaction processing circuit 136 can provide a user interface to alert the user of the user device 110 of the designation. For example, the transaction processing circuit 136 can cause user interface 1100 to display on the user device 110. The alert can include the unverified designation and a way to review the transaction details (e.g., the "Review Transaction" button 1112).

At step 1318, after the computing system generates a designation, the user of the user device 110 can review the transaction details. For example, the user can view any information received and stored by the provider institution computing system 130 corresponding to the transaction (e.g., images captured, date, time, total amount). Reviewing the transaction details can include verifying that the designation is correct or determining that the designation is incorrect.

At step 1320, the user can initiate a fraud claim. If the user determines the transaction was fraudulent (regardless of the designation), the user can initiate a fraud claim. For example, after reviewing the transaction details, the transaction processing circuit 136 can cause user interface 1000 to be displayed on the user device 110. If the user determines that the transaction was fraudulent, the user can select the "File Fraud Claim" button 1012. Responsive to the user selecting the "File Fraud Claim" button 1012, the provider institution computing system 130 can automatically populate the fraud claim with the information stored in the transaction database 140. Once complete, the fraud claim can be submitted via the user device 110.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:

receiving, by a computing system from a user device, first data corresponding to a transaction between a merchant and a customer, the first data comprising a plurality of images captured simultaneously via a plurality of cameras of the user device during the transaction, and identifying information relating to a good purchased during the transaction, the plurality of images comprising a first image depicting the good purchased during the transaction and a second image depicting the customer;

receiving, by the computing system from a third-party device associated with the merchant, second data captured at substantially the same time as the transaction and at a location corresponding to the transaction;

extracting, by the computing system, a first feature from the first image depicting the good and a second feature from the second image depicting the customer;

comparing, by the computing system, the first feature extracted from the first image of the good with the identifying information from the transaction information;

performing, by the computing system, facial recognition on the second feature from the second image depicting the customer;

generating, by the computing system, a designation for the transaction based on a first match between the good identified in the first image and the identifying information and a second match between the depiction of the customer and a profile image of the customer;

storing, by the computing system in an accounts database, third data comprising at least one of the plurality of images and a unique identifier assigned to the transaction, the third data stored in association with an account of the user and having the designation assigned to the third data;

linking, by the computing system, the second data from the third-party device to the third data, by storing at least some of the second data in the accounts database in association with the unique identifier;

receiving, by the computer system from the user device, a response to the designation, wherein the response is one of verifying the designation, changing the designation, or submitting a claim;

updating, by the computer system, the designation in the accounts database based on the response received via the user interface of the user device; and populating, by the computing system, a claim with at least some of the second data and the third data from the accounts database, according to a selection of a user interface element of the user device corresponding to the transaction.

2. The method of claim 1, wherein the designation is generated based on the comparison of the first feature with the second feature.

3. The method of claim 1, wherein the plurality of images are captured via an automatic setting of the user device, wherein the automatic setting causes at least one of the plurality of cameras to capture a plurality of consecutive images over a specific amount of time.

4. The method of claim 1, wherein at least one of the plurality of cameras is a front facing camera of the user device and the second image includes at least one feature corresponding to a user of the user device.

5. The method of claim 1, further comprising validating, by the computing system, a user of a device as the customer, and generating the designation comprising verified based on the user being the customer.

6. The method of claim 1, wherein the second data comprises an image received from the third-party device, the image comprising at least one feature corresponding to the customer and at least one feature corresponding to the good purchased as part of the transaction.

7. The method of claim 6, wherein the at least one feature corresponding to the customer includes an identity of the customer, and the designation is based on the customer matching a user of the user device, and the at least one feature corresponding to the good purchased matching the first data.

8. The method of claim 1, further comprising providing, by a user interface circuit of the computing system to the user device, a user interface comprising the user interface element and at least one of a place and time of the transaction, to whom a payment is made, images related to the transaction, and source of the payment.

9. The method of claim 7, wherein the user interface comprises party information regarding one or more parties involved in the transaction.

10. A system for digitizing proof of transactions, the system comprising:

an accounts database structured to retrievably store data corresponding to a plurality of transactions, the data including information relating to the plurality of transactions, images corresponding to a respective transaction of the plurality of transactions, and a designation for each of the plurality of transactions; and a computing system configured to:

receive first data corresponding to a transaction between a merchant and a customer, the first data comprising a plurality of images captured simultaneously via a plurality of cameras of a user device during the transaction, and identifying information relating to a good purchased during the transaction, and the plurality of images comprising a first image depicting the good purchased during the transaction and a second image depicting the customer;

receive, from a third-party device associated with the merchant, second data captured at substantially the same time as the transaction and at a location corresponding to the transaction;

extract a first feature from the first image depicting the good and a second feature from the second image depicting the customer;

compare the first feature extracted from the first image of the good with the identifying information from the transaction information;

perform facial recognition on the second feature from the second image depicting the customer;

generate the designation for the transaction based on a first match between the good identified in the first image and the identifying information and a second match between the depiction of the customer and a profile image of the customer;

store, in an accounts database, third data comprising at least one of the plurality of images and a unique identifier assigned to the transaction, the third data stored in associated with an account of the customer and having the designation assigned to the third data;

link the second data from the third-party device to the third data by storing at least some of the second data in the accounts database in association with the unique identifier;

receiving, by the computer system from the user device, a response to the designation, wherein the response is one of verifying the designation, changing the designation, or submitting a claim;

updating, by the computer system, the designation in the accounts database based on the response received via the user interface of the user device;

populate a claim with at least some of the second data and the third data from the accounts database according to a selection of a user interface element of the user device corresponding to the transaction.

11. The system of claim 10, wherein the designation is generated based on the comparison of the first feature with the second feature.

12. The system of claim 10, wherein the plurality of images are captured via an automatic setting of the user device, wherein the automatic setting causes at least one of the plurality of cameras to capture a plurality of consecutive images over a specific amount of time.

13. The system of claim 10, wherein the second data comprises an image received from the third-party device, the image comprising at least one feature corresponding to the customer and at least one feature corresponding to the good purchased as part of the transaction.

14. The system of claim 13, wherein the at least one feature corresponding to the customer includes an identity of the customer, and the designation is based on the customer matching a user of the user device, and the at least one feature corresponding to the good purchased matching the first data.

15. A device comprising:
a plurality of cameras; and
a processing circuit communicably coupled to the plurality of cameras, the processing circuit comprising at least one processor and memory storing instructions that, when executed by a processor, cause the processor to:

receive first data corresponding to a transaction between a merchant and a customer, the first data comprising a plurality of images captured simultaneously via the plurality of cameras of the device during the transaction, and identifying information relating to a good purchased during the transaction, and the plurality of images comprising a first image depicting the good purchased during the transaction and a second image depicting the customer;

receive, from a third-party device associated with the merchant, second data captured at substantially the same time as the transaction and at a location corresponding to the transaction;

extract a first feature from the first image depicting the good and a second feature from the second image depicting the customer;

compare the first feature extracted from the first image of the good with the identifying information from the transaction information;

perform facial recognition on the second feature from the second image depicting the customer;

generate a designation for the transaction based on a first match between the good identified in the first image and the identifying information and a second match between the depiction of the customer and a profile image of the customer;

store, in an accounts database, third data comprising at least one of the plurality of images and a unique identifier assigned to the transaction, the third data stored in associated with an account of the customer and having the designation assigned to the third data;

link the second data from the third-party device to the third data by storing at least some of the second data in the accounts database in association with the unique identifier;

receive, via a user interface element of the device, a response to the designation, wherein the response is one of verifying the designation, changing the designation, or submitting a claim;

update the designation in the accounts database based on the response received via the user interface element of the device; and populate a claim with at least some of the second data and the third data from the accounts database according to a selection of a user interface element of the device corresponding to the transaction.

* * * * *